US012608419B1

(12) United States Patent
Trooskens et al.

(10) Patent No.: US 12,608,419 B1
(45) Date of Patent: Apr. 21, 2026

(54) ARTIFICIAL INTELLIGENCE SYSTEMS AND METHODS FOR DETECTING MUSICAL INFRINGEMENT IN SYMBOLIC MUSIC

(71) Applicant: Sound Patrol Inc., Los Angeles, CA (US)

(72) Inventors: Geert Trooskens, Meise (BE); Lamara De Brouwer, Malibu, CA (US); Benjamin Ray Resnick, Plano, TX (US); Walter Adolf De Brouwer, Malibu, CA (US)

(73) Assignee: Sound Patrol Inc., Los Angeles, CA (US)

( * ) Notice: Subject to any disclaimer, the term of this patent is extended or adjusted under 35 U.S.C. 154(b) by 0 days.

(21) Appl. No.: 19/189,941

(22) Filed: Apr. 25, 2025

Related U.S. Application Data

(60) Provisional application No. 63/710,481, filed on Oct. 22, 2024.

(51) Int. Cl.
*G06F 16/683* (2019.01)
*G06F 16/632* (2019.01)

(52) U.S. Cl.
CPC .......... *G06F 16/632* (2019.01); *G06F 16/683* (2019.01)

(58) Field of Classification Search
CPC .............................. G06F 16/632; G06F 16/683
See application file for complete search history.

(56) References Cited

U.S. PATENT DOCUMENTS

| | | | |
|---|---|---|---|
| 11,275,841 B2 | 3/2022 | Poliakov | |
| 11,436,019 B2 | 9/2022 | Pudipeddi et al. | |
| 11,681,918 B2 | 6/2023 | Goswami et al. | |
| 11,842,287 B1 | 12/2023 | Rosenoer | |
| 11,961,233 B2 | 4/2024 | Liu | |
| 11,991,299 B1 | 5/2024 | Rosenoer | |
| 2002/0073098 A1* | 6/2002 | Zhang | G06F 16/634 |
| 2003/0023421 A1* | 1/2003 | Finn | G10H 1/0008 |
| | | | 707/E17.101 |

(Continued)

OTHER PUBLICATIONS

John Thickstun et al., "Learning Features of Music From Scratch", ICLR Apr. 6, 2017, 14 pages.

(Continued)

*Primary Examiner* — Joseph Saunders, Jr.
(74) *Attorney, Agent, or Firm* — FP; Sikander M. Khan

(57) ABSTRACT

The present disclosure relates to a system and method for detecting musical infringement in symbolic music. The system receives a first musical composition and, when provided as audio, converts it into a symbolic format using a transcription neural network trained to extract a main melody. It then generates k-mer sequences comprising consecutive notes, indexes these sequences in a data structure configured for dynamic conditioning, and compares them to reference musical compositions. Upon estimating a similarity measure that exceeds a threshold, the system performs a refined local sequence alignment adapted for music, accounting for key shifts, rests, and melodic or rhythmic variations. Based on this refined alignment, the system determines whether the first musical composition includes a musical fragment that infringes upon or regurgitates a portion of at least one reference composition.

20 Claims, 12 Drawing Sheets

(56)     References Cited

U.S. PATENT DOCUMENTS

| | | | | |
|---|---|---|---|---|
| 2003/0177888 A1* | 9/2003 | Akahori | ............... | G10H 1/0008 |
| | | | | 84/609 |
| 2004/0030691 A1* | 2/2004 | Woo | ...................... | G06F 16/634 |
| 2008/0190272 A1* | 8/2008 | Taub | .................... | G10H 1/0058 |
| | | | | 84/645 |
| 2008/0271592 A1* | 11/2008 | Beckford | ............ | G10H 1/0008 |
| | | | | 84/645 |
| 2012/0167748 A1* | 7/2012 | Bao | ....................... | G06F 16/683 |
| | | | | 84/609 |
| 2013/0305909 A1* | 11/2013 | Kwan | .................... | G06F 21/10 |
| | | | | 84/645 |
| 2015/0317965 A1* | 11/2015 | Horvath | .................. | G10H 1/00 |
| | | | | 84/609 |
| 2015/0339570 A1* | 11/2015 | Scheffler | ................. | G06N 3/04 |
| | | | | 706/27 |
| 2023/0316075 A1 | 10/2023 | Cella et al. | | |

OTHER PUBLICATIONS

Miranda Christ et al., "Undetectable Watermarks for Language Models", arXiv:2306.09194v1 [cs.CR] May 25, 2023, 32 pages.
Rishi Bommasani et al., "On the Opportunities and Risks of Foundation Models", Center for Research on Foundation Models (CRFM)Stanford Institute for Human-Centered Artificial Intelligence (HAI) Stanford University, 214 pages.
Rohith Kuditipudi et al., "Robust Distortion-free Watermarks for LanguageModels", Stanford Center for Research on Foundation Models, 2024, 10 pages.
Rohith Kuditipudi, "Robust Distortion-free Watermarks for Language Models", arXiv:2307.15593v3 [cs.LG] Jun. 6, 2024, 59 pages.

* cited by examiner

100

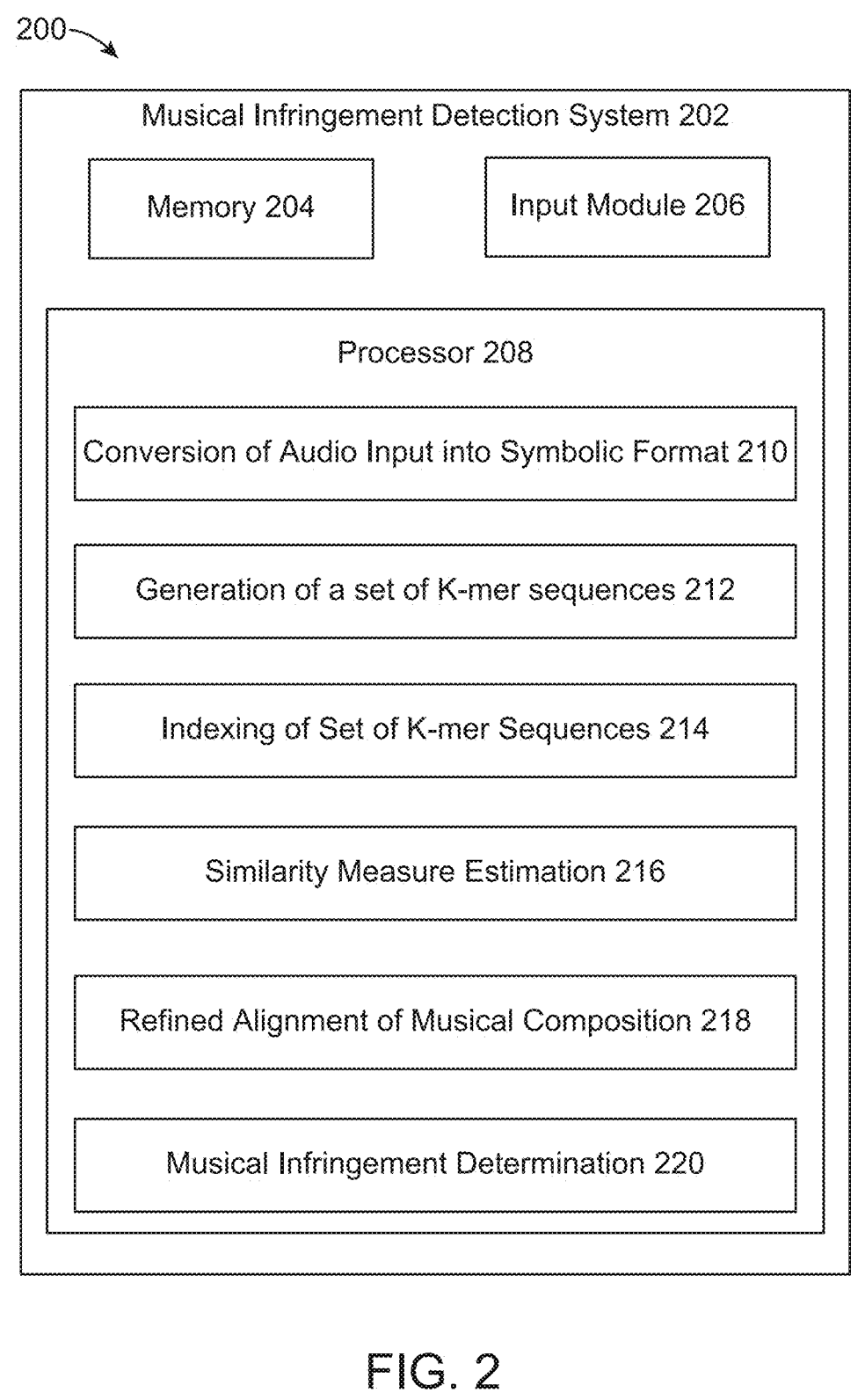

200

Musical Infringement Detection System 202

Memory 204

Input Module 206

Processor 208

Conversion of Audio Input into Symbolic Format 210

Generation of a set of K-mer sequences 212

Indexing of Set of K-mer Sequences 214

Similarity Measure Estimation 216

Refined Alignment of Musical Composition 218

Musical Infringement Determination 220

FIG. 2

$$J(A,B) = \frac{|(A \cap B)|}{|(A \cup B)|} \approx \frac{|S(A \cup B) \cap S(A) \cap S(B)|}{|S(A \cup B)|}$$

800

| 0 | GOOGOL$ |
| 1 | OOGOL$G |
| 2 | OGOL$GO |
| 3 | GOL$GOO |
| 4 | OL$GOOG |
| 5 | L$GOOGO |
| 6 | $GOOGOL | sorting 0
1
2
3
4
5
6

900

1     10 24        61 73         121 ← Position in the input alignment

Input (re)align   preserve   (re)align   preserve   (re)align

Output

1000

Red — 1002
Green — 1004
Blue/Purple Background — 1106

ARTIFICIAL INTELLIGENCE SYSTEMS AND METHODS FOR DETECTING MUSICAL INFRINGEMENT IN SYMBOLIC MUSIC

PRIORITY APPLICATION

This application claims the benefit of and priority to U.S. Provisional Patent Application No. 63/710,481, titled "Algorithms and Models for Detecting Musical Infringement in Symbolic Music," filed Oct. 22, 2024.

BACKGROUND

Technical Field

The technology disclosed relates to artificial intelligence type computers and digital data processing systems and corresponding data processing methods and products for emulation of intelligence (i.e., knowledge-based systems, reasoning systems, and knowledge acquisition systems); and including systems for reasoning with uncertainty (e.g., fuzzy logic systems), adaptive systems, machine learning systems, and artificial neural networks. The present disclosure relates to the field of computational music analysis. In particular, the present disclosure relates to computer-implemented systems, methods, and products for detecting potential copyright infringements in symbolic music.

Description of Related Art

The "background" description provided herein is to generally present the context of the disclosure. Work of the presently named inventors, to the extent it is described in this background section, as well as aspects of the description which may not otherwise qualify as prior art at the time of filing, are neither expressly nor impliedly admitted as prior art against the present invention.

Copyright protection in the musical domain is a fundamental concern for the creative arts and entertainment industries. As the musical landscape has evolved, digital technologies have given rise to new challenges for ensuring that creators' rights are upheld. Historically, identifying potential infringements relied heavily on manual comparisons by musicologists and other experts, a process that was both time-consuming and constrained by subjective interpretation. The widespread availability of digital audio recordings and computational tools led to the development of early automated methods for comparing music. Many of these approaches focused on analyzing audio signals directly, relying on spectrographic and frequency-based techniques. While such methods performed effectively at detecting exact or near-exact matches, they frequently struggled to discern subtle but important relationships between musical works, such as transpositions or changes in arrangement, instrumentation, and rhythm.

Subsequent efforts turned toward symbolic representations, including MIDI, where musical elements are encoded as note events, intervals, and rhythms rather than as raw audio signals. Symbolic approaches hold promise for providing more detailed, structural insight into the underlying musical content. They allow direct comparison of melodic contours and harmonic progressions independently of the sonic qualities of a particular performance. Existing symbolic methods, however, often rely on straightforward substring or pattern matching techniques that are limited in their ability to handle large, diverse databases. These techniques may not scale efficiently when the repertoire under consideration includes millions of notes spanning thousands of compositions, and they often cannot flexibly adapt to new or evolving search criteria without extensive computational overhead.

The use of generative artificial intelligence and machine learning models in music production has introduced a new layer of complexity. These models, trained on extensive music corpora, can produce outputs that sometimes incorporate recognizable fragments of copyrighted works. Such regurgitations may differ subtly from the originals. They might be transposed into a new key, embedded in a modified rhythm, or interspersed with additional notes that mask direct copying. Purely audio-based fingerprinting or simple symbolic matching techniques often fail to capture these nuanced similarities. The capacity for generative models to produce an enormous volume of variations further complicates detection.

Current methods lack robust mechanisms for identifying these subtle infringements. Many do not leverage advanced indexing frameworks that draw inspiration from bioinformatics, where sequence alignment techniques are routinely used to handle large datasets and match patterns subject to insertions, deletions, and substitutions. Existing systems integrate probabilistic similarity metrics, dynamic conditioning strategies, or flexible alignment methods that can account for key shifts and rests in music. Few approaches consider blending symbolic analysis with audio fingerprinting to provide a comprehensive, multi-modal examination of the material. In addition, the emerging utility of deep learning-based contrastive embeddings, which can cluster variants of a musical piece by their structural core identity rather than by mere surface-level features, remains largely unexploited.

These limitations underscore the need for a comprehensive solution that fuses advanced indexing, alignment methods borrowed from fields such as genomics, and multimodal analysis, while employing neural embeddings to recognize the musical essence of a piece across transformations. Such a system and method should be capable of handling large-scale databases and adjusting to varied query conditions, but also detect subtle, AI-generated regurgitations that traditional systems overlook.

SUMMARY

Systems, methods, and products are described herein with respect to illustrative implementations of the present invention that detect musical infringement in symbolic music by converting audio inputs into symbolic formats, generating sets of k-mer sequences, indexing these sequences for efficient retrieval under variable search criteria, and performing alignment and similarity estimations to identify musical fragments that may infringe upon or regurgitate portions of known reference compositions. Such systems, methods, and products incorporate transcribed main melodies, handle dynamic conditioning vectors to flexibly adjust the scope of matching criteria, and employ refined local sequence alignment adapted for musical structures including key shifts, rests, and subtle rhythmic or melodic variations. The embodiment further includes indexing data structures, MinHash sketches, and network representations of compositions to achieve scalable and nuanced comparisons, potentially combining symbolic analysis with audio fingerprinting to capture a fuller spectrum of musical similarity.

More specifically, in one embodiment a system is described that includes one or more processors and one or more memories configured to store instructions that, when executed, convert an audio input into symbolic format using a transcription neural network. The transcription neural network is trained to isolate a main melody, generate k-mer sequences from the resulting symbolic music, and index these k-mer sequences in a data structure capable of handling dynamic conditioning vectors without requiring full reindexing.

The system then compares the k-mer sequences of a first musical composition to those of reference musical compositions, estimates a similarity measure, and if a threshold is exceeded, performs a refined local sequence alignment to determine whether the first musical composition includes at least one fragment that infringes upon or regurgitates a portion of a reference composition.

In some embodiments, at least one data cleaning step is applied prior to generating the k-mer sequences, including filtering out anomalous notes, converting chords to consecutive notes, normalizing keys, and removing low-entropy segments. In some embodiments, the local sequence alignment is performed by representing both compositions on a quantized temporal grid and constructing a differential similarity matrix. In some embodiments, a larger set of conditioning vectors is applied if the initial similarity measure does not meet the threshold, thereby broadening the search criteria.

In some embodiments, an audio input is received and converted into symbolic format via a model trained to isolate the main melody. In some embodiments, the k-mer sequences are indexed in a hash table with metadata such as instrument identifiers, positional data, and song identifiers to enable both approximate and precise retrieval.

In some embodiments, MinHash sketches are generated for both the first and reference compositions, providing reduced-size approximations that facilitate efficient Jaccard similarity estimation. In some embodiments, alignment scoring elements are used so that matched notes receive positive scores, rest-to-rest matches are neutral, and mismatches incur penalties, distinguishing subtle variations from direct copying.

In some embodiments, results from audio fingerprinting analysis are overlayed with symbolic alignment results to detect subtle variations not captured by symbolic analysis alone. In some embodiments, the system constructs network representations of the compositions, where nodes represent notes and edges represent transitions, enabling the detection of recurring motifs or progressions indicative of regurgitated content.

In some embodiments, a method for detecting musical infringement in symbolic music is disclosed. The method includes receiving a musical composition, generating k-mer sequences, indexing them dynamically, comparing them to reference compositions, estimating similarity, determining threshold exceedance, performing local sequence alignment, and deciding on infringement. In some embodiments, data cleaning steps are applied before k-mer generation. In some embodiments, local sequence alignment is performed using a quantized temporal grid, differential similarity matrix, and dynamic programming algorithms such as Smith-Waterman or Needleman-Wunsch. In some embodiments, a broader set of conditioning vectors is applied if initial similarity is insufficient. In some embodiments, audio is transcribed into symbolic format, focusing on the main melody for subsequent analysis. In some embodiments, indexing involves storing k-mers in a hash table with metadata for efficient retrieval. In some embodiments, MinHash sketches are generated as reduced-size set approximations. In some embodiments, alignment scoring differentiates between matched notes, rest matches, and mismatches. In some embodiments, audio fingerprinting results are combined with symbolic alignment for nuanced detection of subtle infringements.

One or more non-transitory, computer-readable media is configured to execute one or more instructions to perform steps of storing instructions that cause processors to perform operations including receiving a symbolic musical composition, generating k-mer sequences, indexing them dynamically, comparing them to reference compositions, estimating similarity, determining threshold exceedance, performing local sequence alignment to account for variations, and ultimately deciding whether the composition includes infringing content.

The above embodiments and implementations are not necessarily inclusive or exclusive of each other and may be combined in any manner that is non-conflicting and otherwise possible, whether they be presented in association with a same, or a different, embodiment or implementation. The description of one embodiment or implementation is not intended to be limiting with respect to other embodiments or implementations. Also, any one or more function, step, operation, or technique described elsewhere in this specification may, in alternative implementations, be combined with any one or more function, step, operation, or technique described in the Summary. Thus, the above embodiments and implementations are illustrative rather than limiting.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2 is a function block diagram of a musical infringement detection system configured to detect regurgitations in symbolic music, according to certain embodiments.

DETAILED DESCRIPTION

Figure 1:
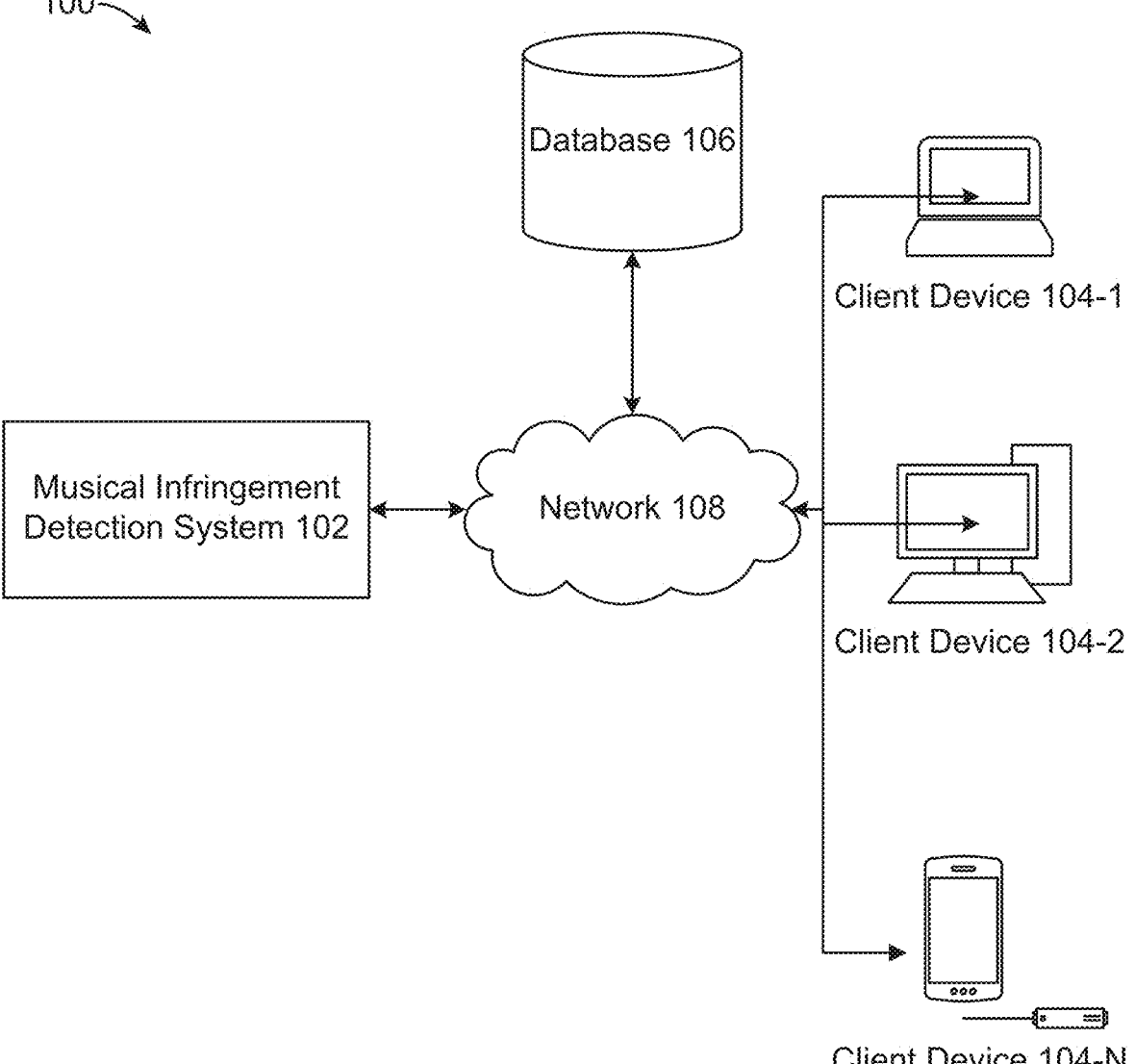
FIG. 1 is an example of environment for detecting musical infringement in symbolic music, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Introduction

Aspects of this disclosure are directed to a system, device, and method for detecting musical infringement in symbolic music by analyzing compositions at a granular, structural level. The system includes a processor configured to transcribe audio inputs into a symbolic format, isolate core melodic segments, and generate k-mer sequences of notes. These k-mer sequences are indexed using dynamic indexing strategies, enabling selective matching of melody-only, rhythm-only, or combined criteria without the need for full database reindexing.

The system implements probabilistic similarity measures to efficiently compare k-mer sets. When a similarity threshold is exceeded, the system refines its analysis using local sequence alignment algorithms that account for musical key shifts, rests, and subtle variations introduced by generative AI models. This alignment ensures that nuanced regurgitations of copyrighted material can be identified even when no exact melodic copy exists.

The system further integrates complementary modalities, such as audio fingerprinting and network-based representations of musical compositions, to provide a holistic analysis. The system performs large-scale comparisons by adapting bioinformatics-inspired indexing and alignment techniques, and utilizes deep learning models to map different versions of the same underlying composition into a shared embedding space. Users can adjust search parameters, broaden conditioning vectors, and detects patterns, motifs, and subtle infringements at scale.

By orchestrating these capabilities, the present disclosure provides a robust and efficient framework for detecting both overt and subtle musical infringements, safeguarding copyrighted works in an era of rapidly evolving generative music models.

Detection of Musical Infringement

FIG. 1 is an example of environment 100 for detecting musical infringement in symbolic music. Environment 100 is hosted on one or more computing devices, servers, or another suitable set of computing resources. Environment 100 includes system 102, database 106, network 108, and a plurality of client devices, including client device 104-1, client device 104-2, and client device 104-N. Each of these elements is implemented using suitable hardware, software, or a combination thereof, and is configured to perform operations that facilitate the detection of infringing musical patterns.

System 102 is configured to detect musical infringement in symbolic music. System 102 is operable to execute instructions stored in one or more memories using one or more processors. System 102 is configured to receive musical data (e.g., MIDI files or other symbolic representations) from client devices 104-1, 104-2, and 104-N or from database 106. System 102 is operable to convert audio inputs into symbolic formats (such as MIDI) using a transcription neural network trained to isolate a main melody. By focusing on the main melody, system 102 ensures that copyright-relevant aspects of a composition are accurately extracted. System 102 is operable to process symbolic music by applying data cleaning procedures, including filtering anomalous notes, converting chords into consecutive notes, normalizing keys, and removing sequences below a certain entropy threshold, ensuring that only meaningful musical elements are retained.

System 102 is configured to generate sets of k-mer sequences from the symbolic musical input. A k-mer sequence is a short, consecutive sequence of notes (e.g., an 8-note sequence). By breaking a composition into k-mer sequences, the system 102 obtains granular musical units that can be efficiently indexed, retrieved, and compared. The system 102 is configured to index these k-mer sequences in an indexing structure optimized for efficient retrieval and dynamic conditioning. Such indexing is performed using hash tables and B-trees, enabling system 102 to handle large databases without reindexing the entire dataset when query conditions change. The system 102 is operable to apply a k-mer conditioning vector that specifies how to handle positions within the k-mer sequence, including ignoring positions, focusing on melody-only or rhythm-only matches, or accounting for insertions and deletions. This dynamic conditioning facilitates flexible and targeted similarity searches that adapt to varying user requirements.

The system 102 is operable to estimate similarity measures between the query composition and reference compositions stored in database 106. The system 102 is configured to employ MinHash and Jaccard similarity for estimating the overlap between sets of k-mer sequences. MinHash is a technique that generates compact sketches of sets, enabling computationally efficient approximation of the Jaccard similarity. The Jaccard similarity is a measure of how many elements two sets share relative to their union. By using MinHash, system 102 avoids the computational complexity of direct intersection and union computations on large sets of k-mers. If the similarity measure exceeds a threshold, the system 102 is operable to perform a refined local sequence alignment using algorithms adapted from bioinformatics (e.g., Smith-Waterman or Needleman-Wunsch) to confirm the presence of potential infringement. This local alignment accounts for musical-specific variations, including differences in key, presence of rest notes, and subtle rhythmic or melodic modifications that might arise from generative AI models producing regurgitations of existing copyrighted works.

System 102 is operable to combine symbolic and audio-based analyses to achieve a more comprehensive comparison. By overlaying audio fingerprinting analysis (performed on spectrogram data using techniques like FFT-based feature extraction) with symbolic alignment heat maps, system 102 provides a hybrid approach. This combination enables detection of subtle variations, remixes, or patterns that would be challenging to identify using symbolic or audio analysis alone. System 102 is also configured to represent compositions as musical networks, where notes are nodes and transitions are edges. This network-based representation facilitates structural comparisons and identification of recurring motifs or sequences that are indicative of regurgitations.

Database 106 is a storage repository configured to store large collections of symbolic musical data, reference compositions, and associated metadata. Database 106 is configured to store indexing data structures, k-mer sequences, conditioning vectors, MinHash sketches, and machine learning models, including transcription neural networks and embedding models for contrastive analysis. Database 106 is implemented using suitable storage technologies to handle large volumes of musical data efficiently, supporting concurrent read/write operations and scaling to massive symbolic music datasets.

Network 108 is a communication infrastructure that provides data transfer capabilities between system 102, database 106, and the client devices 104-1, 104-2, and 104-N. Network 108 is configured as a wired and/or wireless communication medium and is implemented using known networking protocols. Network 108 enables client devices to upload new compositions, request similarity assessments, and retrieve results. Network 108 also enables system 102 to access database 106 for performing indexing, retrieval, alignment, and comparison operations. Network 108 ensures secure and efficient data exchange, maintaining performance and reliability even as the number of concurrent requests or volume of data increases.

Client devices 104-1, 104-2, and 104-N are computing devices operated by users (e.g., composers, publishers, or other stakeholders) who seek to analyze a musical composition for potential infringement. Each client device 104-1, 104-2, or 104-N is a laptop, smartphone, desktop computer, tablet, or another device equipped with user interfaces that allow users to upload audio or symbolic music. Users interact with system 102 through these client devices to submit queries, adjust search parameters, or request more flexible conditioning vectors. Users can specify if they want melody-only comparisons, rhythm-only focus, or tolerance to insertions/deletions in k-mer sequences. Users can also request network-based analyses, deep learning-based embeddings, or hybrid symbolic and audio fingerprinting approaches for a comprehensive detection of subtle regurgitations.

System for Musical Infringement Detection

FIG. 2 is a function block diagram of a musical infringement detection system 202 configured to detect regurgitations in symbolic music. The musical infringement detection system 202, alternatively referred to as system 202 hereinafter, is a representation of the musical infringement detection system 102, as described in conjunction with FIG. 1. Environment 200 may be hosted on a user computing device, on a server, or on another suitable computing device. Environment 200 includes a musical infringement detection system 202, a processor 208, a memory 204, an input module 206, and various other components and data structures described below. The musical infringement detection system 202 may execute instructions for analyzing and comparing musical compositions in symbolic formats (e.g., MIDI) to identify potential copyright infringements. In some embodiments, the musical infringement detection system 202 may reside on a physical server or a virtual server running on a physical computer system. In other embodiments, the musical infringement detection system 202 may be configured on a user device (e.g., a laptop computer, a smartphone, a desktop computer, an electronic tablet, or another suitable user device).

The memory 204 may store various data, including instructions for processing musical inputs, indexing k-mer sequences, applying conditioning vectors, estimating similarity measures, performing local sequence alignments, and identifying musical infringement. The memory 204 may include a combination of hardware (e.g., memory chips, disks) and software (e.g., for reading and writing data to hardware). For example, the memory 204 may store executable code for hashing functions that process k-mer sequences, algorithms for dynamic conditioning vectors, and references to MinHash sketches. MinHash sketches are compact data representations that allow for quick approximation of the Jaccard similarity between large sets. Jaccard similarity measures how many elements two sets share relative to their union. In this example, the sets are collections of k-mer sequences extracted from different musical compositions. MinHash functions by repeatedly hashing the elements and recording the minimal hash values seen, which creates a "sketch" that approximates set similarity without enumerating all elements. The memory 204 may also contain references to large symbolic music collections, such as MetaMidi, bitMidi, Supreme Midi, or Midiworld databases. The collections consist of extensive libraries of musical compositions in MIDI format, each composition represented as a series of note events. MIDI (Musical Instrument Digital Interface) is a standard that encodes musical notes, pitches, durations, and velocities as digital messages. For example, a single MIDI note event includes information like pitch (e.g., note number 60, corresponding to Middle C), duration (in beats or ticks), and velocity (a measure of how forcefully the note is played). By using MIDI, the musical infringement detection system 202 can directly compare the underlying musical structure of pieces.

The musical infringement detection system 202 may interact with one or more databases to store and retrieve symbolic music data, k-mer indexes, MinHash sketches, reference compositions, scoring parameters, and other associated information required for infringement detection. For example, large collections like MetaMidi contain thousands of MIDI files from various genres, while bitMidi hosts a wide range of user-contributed MIDI files, Supreme Midi may include curated professional transcriptions of well-known pieces, and Midiworld might offer a diverse collection of classical and popular music MIDI tracks. These large collections ensure that the musical infringement detection system 202 can search and compare against a broad repertoire to detect potential infringements. When analyzing these large datasets, the system 202 applies indexing and similarity estimation techniques, such as MinHash sketches, to efficiently handle the computational complexity. Without MinHash, comparing every k-mer sequence from one composition against millions of k-mer sequences in a massive database would be computationally prohibitive.

In some embodiments, musical infringement detection system 202 may receive an audio input representing a musical composition (e.g., from a user device or another suitable source). Examples of the musical composition include original compositions created by artists or composers and recorded in audio format, such as a live jazz improvisation transcribed into MIDI notes. The musical composition can also include AI-generated music produced by neural models trained on musical datasets, such as a melody inspired by classical composers like Beethoven or Bach. Traditional or folk music recordings, such as a Celtic folk tune or an Indian raga, and remixed music, where a producer or DJ creates variations of an existing piece, also serve as examples. Additionally, live performances, including orchestral symphonies or rock concerts, and cover versions of popular songs, interpreted by different artists, can be transcribed into symbolic music for analysis and comparison within the system.

In an implementation of the present embodiment, the input module 206 may be configured to receive the audio input of a first musical composition and provide the audio input to the processor 208 for further processing. In cases where only symbolic music data is available (e.g., a user directly provides a MIDI file), the input module 206 transmits the symbolic representation to the downstream components. If an audio input is provided instead, the processor 208 converts the audio into MIDI (symbolic) format. The conversion is performed by the processor 208 using a transcription neural network model trained to isolate the main melody. For example, if the system 202 receives a recording of a jazz standard with multiple instruments, the transcription model focuses on extracting the lead melody line (e.g., the saxophone's melodic phrases), ensuring that subsequent comparisons emphasize the most copyright-relevant aspects.

The conversion process transforms raw audio data into a structured, machine-readable format that captures essential musical elements, including pitch, duration, and timing. The transcription neural network is configured to isolate the primary melodic line from accompanying harmonies, rhythms, or background noise, providing a focused representation of the main melody. Thereby, conversion of an audio input into a symbolic format renders downstream processing, and ensures that the complexity of full polyphonic transcription is avoided, thus focusing on the main melody, which is often central to copyright disputes.

When the audio input is received, the musical infringement detection system 202 utilizes the processor 208, which may comprise one or more processors or processing units, to convert the audio input into a symbolic format, as indicated by ta process step of conversion of audio input into symbolic format 210 operation. Once converted to MIDI, the system 202 can precisely represent each note played, including pitch, timing, and velocity. In an example, if the input is a short audio clip featuring a scale (e.g., C, D, E, F, G), the transcription output is a sequence of MIDI notes with corresponding pitches (C=60, D=62, etc.) and durations. By focusing on relative note differences rather than absolute pitch values, the system 202 achieves key normalization, ensuring that a melody transposed from C major to D major still matches the same motif pattern when searching for similar sequences in other compositions.

After obtaining the symbolic format, musical infringement detection system 202, via processor 208, generates a set of k-mer sequences from the symbolic composition, indicated by Generation of a Set of k-mer Sequences 212. A k-mer sequence refers to a sequence of overlapping substrings of fixed length k derived from a larger sequence. Generating a k-mer sequence is a method of fragmenting a symbolic representation of music, such as MIDI or note sequences, into smaller, fixed-length segments that can be analyzed, indexed, and compared for similarity. Each k-mer (e.g., an 8-mer) is a sequence of eight consecutive notes, capturing a small melodic fragment. For instance, if a melody is "C, D, E, F, G, A, B, C," one 8-mer would represent these eight notes. Key normalization ensures that if the same melodic shape appears starting from a different note, it still matches. Such independence is achieved by storing note intervals rather than absolute pitches. Intervals might be represented as differences, for example, C to D is a +2 semitone difference, D to E is another +2, and so forth.

After generating the k-mer sequences, the musical infringement detection system 202 indexes them in a data structure optimized for efficient retrieval, indicated by a process step of indexing of set of K-mer sequences 214. This indexing structure uses hash tables to store references to k-mer sequences, allowing fast lookups. The system 202 can apply dynamic conditioning vectors to selectively focus on certain aspects of the k-mer, such as ignoring particular positions, comparing only rhythm patterns, if the vector flags a position as rhythm-only, or allowing for insertions and deletions. For instance, if a conditioning vector specifies "2" for all positions, the system 202 focuses on melody-only matches. If an insertion is allowed (represented by "−2" in the vector), a k-mer that has one extra note in the query can still match a k-mer in the database by shifting elements accordingly. Such dynamic conditioning reduces computational overhead by preventing the need to reindex the entire database when new search criteria are introduced.

With k-mers indexed, the system 202 compares the k-mer sequences of the target composition to those in the reference databases, estimating a similarity measure indicated by Similarity Measure Estimation 216. The system 202 uses MinHash sketches, which are small, representative subsets of the hash values from each composition's k-mers. By comparing MinHash sketches, the system 202 approximates the jaccard similarity index, which measures how many k-mers two compositions share relative to their combined total. For example, if two compositions share 40% of their k-mers, the Jaccard similarity is about 0.4. MinHash makes it unnecessary to compare all k-mers directly, significantly speeding up computations, especially with large databases. Without MinHash, estimating similarity would require intersecting massive sets of k-mers, which is computationally expensive. MinHash thus provides a probabilistic yet highly effective shortcut to narrow down candidates.

The system 202 determines that if the query composition shares a substantial portion of its melodic fragments with another piece. If the estimated similarity measure exceeds a certain threshold, the musical infringement detection system 202 performs a refined alignment of the musical compositions using a local sequence alignment algorithm function adapted for music, indicated by a process step of refined alignment of musical composition 218. During the refined alignment, the system 202 constructs a differential similarity matrix comparing each note at a quantized temporal position. It may also handle rests explicitly, scoring rest-to-rest alignments neutrally and imposing penalties for mismatches or gaps. For example, if one composition has a note sequence C-E-G and another has C-D-G, the alignment might yield a small penalty at the middle note mismatch. If key changes occur, the system 202 compensates by focusing on intervals rather than absolute pitches. If a rest appears in one composition but not the other, the system 202 can insert a gap with a defined penalty.

Following the refined alignment, the musical infringement detection system 202 evaluates the alignment results to determine whether the target composition includes any infringing musical fragments, indicated by a process step of musical infringement determination 220. The system 202 checks if the aligned segments resemble copyrighted material beyond an acceptable similarity threshold. For example, if a motif of eight notes is almost identical-except for a minor rhythmic shift-across compositions, and the motif is known to be a significant copyrighted melody, the system 202 may conclude that infringement or at least strong suspicion of regurgitation has occurred. If a generative AI model produced the new composition, it can be identified whether the model inadvertently recreated patterns it learned from copyrighted works, thus ensuring that content owners can detect unauthorized uses of their material.

In addition, the system 202 may integrate audio fingerprinting or network-based representations of musical compositions for a richer analysis. For instance, overlaying spectrogram-based audio fingerprint data with symbolic alignment results may highlight subtle differences in tempo or timbre not apparent from note sequences alone. Additionally, by constructing a network representation of notes as nodes and transitions as edges, the system 202 can find recurring motifs or chord progressions even if rearranged across the piece. The system 202 thus detects more complex forms of regurgitation, such as when a generative model merges motifs from multiple sources.

Before indexing and analyzing sequences, the system 202 applies data cleaning steps. These may include filtering out anomalous pitches (e.g., if a transcription model erroneously detects a very high pitch that does not fit the melodic context), converting chords into consecutive notes so that harmonic clusters become linear sequences for k-mer extraction, and removing sequences with low entropy (i.e., very repetitive or trivial passages) that do not provide meaningful distinctive patterns. For example, if the input piece has a large section of repeated rests or the same note repeated hundreds of times, that segment may be considered low in entropy and filtered out. By normalizing keys, the system 202 ensures that a melody starting on C or starting on D is treated similarly for comparison, focusing on relative intervals rather than absolute pitches. For instance, a C major scale (C-D-E-F-G-A-B) and a D major scale (D-E-F #-G-A-B-C #) share the same interval pattern, so a key normalization step maps both to the same abstract pattern.

Method for Musical Infringement Detection

Figure 3:
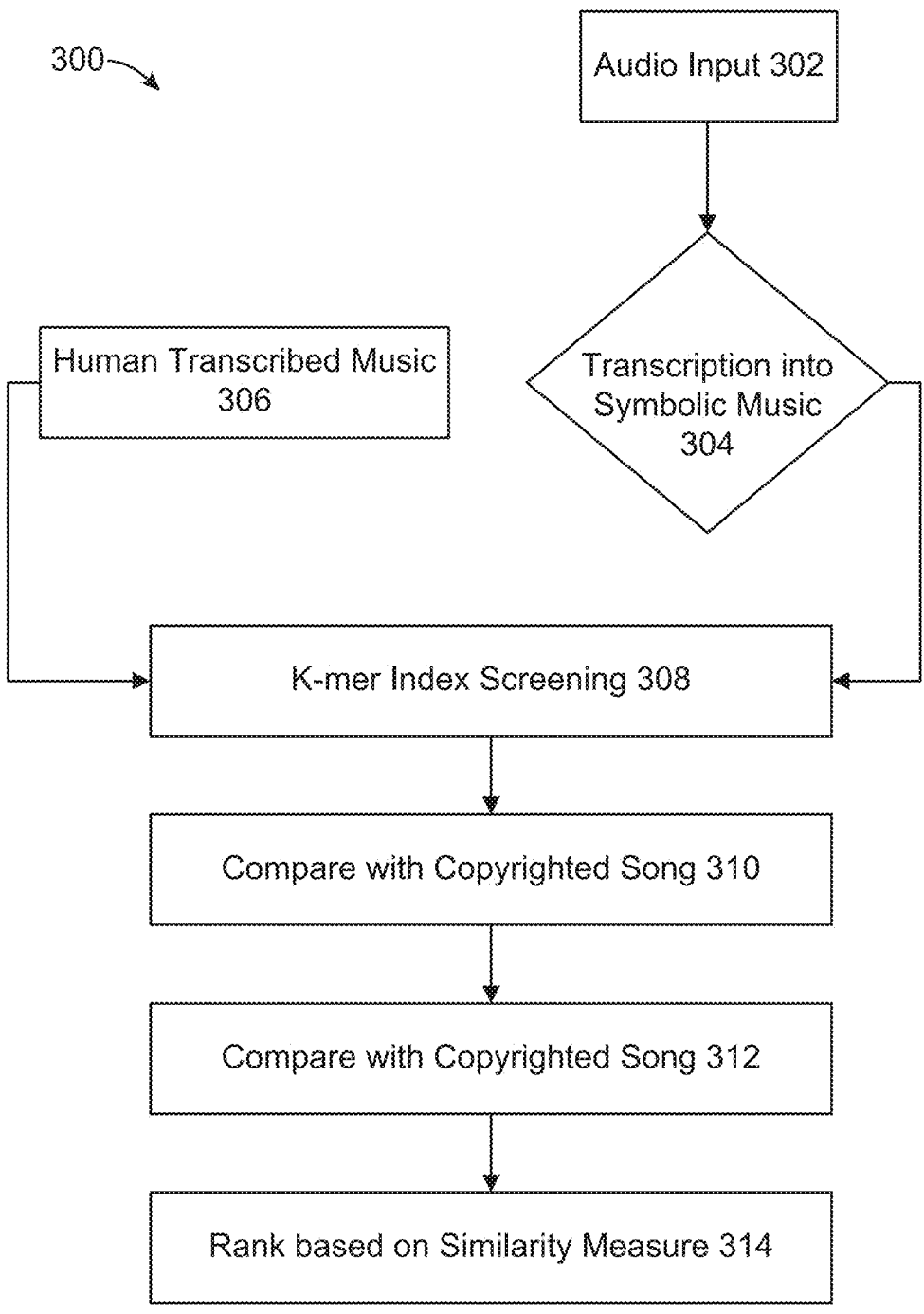
FIG. 3 is a flow chart of a method for detecting musical similarities and potential infringements, according to certain embodiments.

FIG. 3 is a flow chart of a method for detecting musical similarities and potential infringements, as implemented by the musical infringement detection system 202 described herein. The method illustrated in FIG. 3 may be performed by one or more processors and memories executing instructions, and may be hosted on a user computing device, on a server, or another suitable computing device. Each component shown in FIG. 3 is configured to operate in accordance with the functionalities and techniques described in the disclosure and supported by the claims, ensuring that the system 202 can detect regurgitations in symbolic music and identify potential copyright infringements.

The method includes receiving an audio input, at step 302, representing the initial audio data received by the system. The audio input may be provided from a user device, a database of recorded music, or another suitable source. In some embodiments, this step corresponds to receiving an audio input as described in the claims. For example, the system 202 may receive an audio file (e.g., MP3, WAV) containing a musical composition, possibly one that is newly created, a user's upload, or an audio sample extracted from a larger piece of music. This audio input sets the stage for all downstream processes by providing the raw musical material that will be transcribed and analyzed.

Upon receiving the audio input, the method includes transcribing the audio input into symbolic music format, at step 304. In step 304, the system 202 uses a transcription neural network to convert the audio input into a symbolic format, such as MIDI. By transcribing the main melody from the audio data, the system 202 focuses on the most copyright-relevant aspects of the composition, extracting a main melody to isolate the core musical elements. For example, if the input is a polyphonic recording, the transcription model concentrates on capturing the principal melodic line, ensuring that subtle melodic patterns are accurately preserved for further comparison. This transcription process enables the system 202 to rely on symbolic representations (e.g., sequences of note events with pitch, duration, and velocity) rather than raw audio signals, thereby providing a more precise basis for detecting musical similarities.

In parallel or as an alternative to automated transcription, the method includes incorporating human transcribed music, at step 306. Step 306 acknowledges that not all musical compositions are available in a suitable audio format for automated transcription, or that certain cases may require manual intervention. A human operator, such as a musicologist or a rights holder's analyst, may provide a symbolic representation (e.g., a MIDI transcription or a musical score converted into MIDI) directly. In some embodiments, this corresponds to receiving a symbolic format input directly, as described in the claims. Whether obtained through automated transcription (step 304) or human transcription (step 306), the result is a symbolic format that encodes the underlying musical structure essential for further analysis.

After obtaining the symbolic representation, the method performs step 308, k-mer index screening. In step 308, the system 202 segments the symbolic music into k-mers, which are short sequences of consecutive notes (e.g., 8-mer sequences) that serve as fundamental units for similarity analysis. K-mer extraction facilitates efficient indexing and comparison. For example, if the melody is "C-D-E-F-G-A-B-C," one k-mer might be the sequence of these eight notes. By focusing on intervals and normalizing keys, the system 202 ensures that transposed versions of the same motif are treated similarly. This indexing process, supported by hashing techniques and dynamic conditioning vectors outlined in the claims, allows the system 202 to handle large databases of reference compositions and quickly retrieve potential matches.

The method then performs the comparison stages. At step 310, k-mer sequence is compared with copyrighted song. Step 310 correspond to searching and comparing extracted k-mers from the input composition against extensive reference databases containing known, copyrighted musical works. In accordance with the claims, the system 202 uses approximate and precise matching capabilities, MinHash sketches, and Jaccard similarity estimations to rapidly identify candidate matches. For example, one comparison module may focus on melodic-only matches, while another comparison module considers melody-plus-rhythm matches, or vice versa. Alternatively, one module may handle a subset of the reference database, and the other may handle a different subset. These comparisons are indicative of similarity measures that reflect how closely the input composition's motifs resemble known copyrighted fragments. The claims specify that once a certain similarity threshold is exceeded, refined local sequence alignment techniques (e.g., Smith-Waterman) may be employed to confirm subtle matches that are not exact copies but still represent suspiciously similar patterns (i.e., AI-generated regurgitations).

The method further includes ranking the K-mer sequences based on similarity measure, at step 314, where the identified matches from the comparison steps are organized and prioritized according to their similarity scores. For example, the system 202 may assign higher ranks to those k-mer matches that show near-identical patterns of notes or strong intervallic correspondences. This final ranking aids in determining which results warrant closer examination. The ranking, thereby, represents a sequence where the most suspicious cases of potential infringement are addressed first, allowing human reviewers or automated processes to focus their attention where it is needed most. For instance, a match that closely replicates a unique melodic fragment from a known copyrighted song would appear near the top of the rank, prompting immediate scrutiny. On the other hand, weaker matches would appear lower in the ranking, indicating that the observed similarities might be coincidental or stylistic rather than infringing.

The reception of audio input and transcription into symbolic format reflects the system's foundational capability to handle various input modalities. The extraction and indexing of k-mers, along with the application of conditioning vectors and MinHash-based similarity estimation, implement the efficient retrieval and comparison methods claimed. The comparison steps, culminating in a rank based on similarity, ensure that the system 202 thoroughly evaluates the input composition against a corpus of reference works, identifying those instances where subtle regurgitations might cross the line into infringement.

Indexing Musical K-Mers

Figure 4:
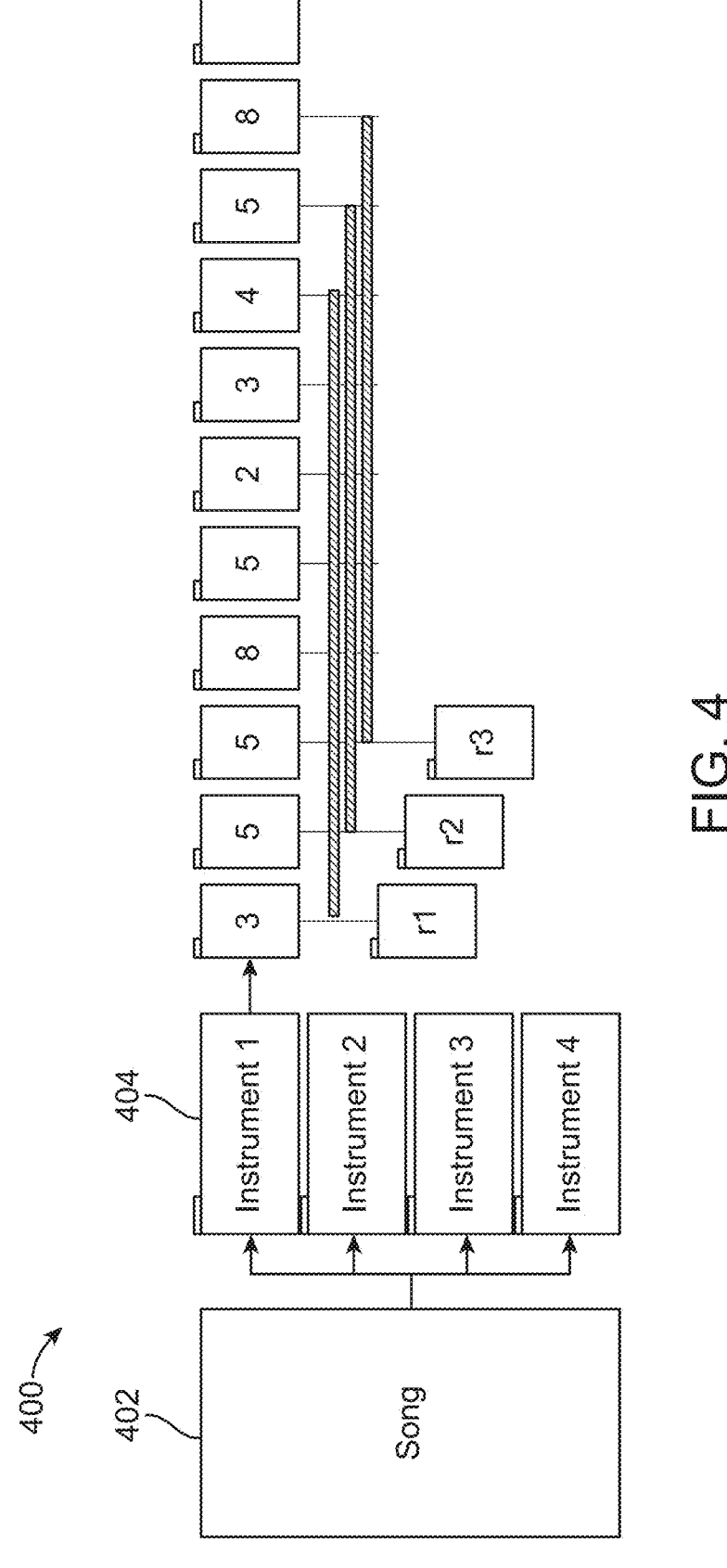
FIG. 4 is an exemplary representation of indexing musical k-mers within a symbolic music composition, according to certain embodiments.

FIG. 4 is an exemplary representation of a method 400 for indexing musical k-mers within a symbolic music composition, as implemented by the system 202 described herein. The method step of indexing includes receiving a musical composition in symbolic format, represented as song input, step 402. The song inputs step 402 includes providing a symbolic representation of a musical piece, such as a MIDI file, which encodes the underlying musical notes, rhythms, and structural elements of the composition. As a result of the symbolic format, the subsequent indexing operations can focus on the note-based structure rather than audio waveforms, thereby enabling more accurate and meaningful analyses.

Following receipt of the song input at step 402, the method 400 includes separating the composition into multiple instrumental tracks, collectively referred to as Instruments 404. For example, a composition may be divided into Instrument 1, Instrument 2, Instrument 3, and Instrument 4, each representing a distinct layer or voice within the overall piece. By parsing the composition into these separate instrumental tracks, the method 400 can analyze the contributions of each instrument individually, capturing melodies, harmonies, or rhythmic patterns unique to a particular instrument. The separation step is performed for identifying and comparing musical fragments specific to each layer, as required by the system's infringement detection strategies described in the disclosure.

Once the instrumental tracks have been identified, the method 400 employs a sliding window (shingling) process to generate k-mers-short, consecutive sequences of notes that serve as fundamental units for comparison and retrieval. During this step, the system 202 extracts overlapping segments of notes from each instrumental track. For instance, if an 8-mer window is used and the track contains a sequence of notes such as 3, 5, 5, 8, 5, 2, 3, 4, 5, 8, each overlapping 8-note segment becomes a distinct k-mer. These k-mers provide a standardized measure for identifying and indexing melodic or rhythmic motifs within the composition.

After generating the k-mers, the method 400 proceeds with the indexing step. Each k-mer sequence is hashed to create a unique index, facilitating efficient storage, retrieval, and comparison. The method 400 maintains a linking table that associates each indexed k-mer with its corresponding instrument, positional information within the track, and the unique identifier of the composition. In this way, the indexing infrastructure ensures that the system 202 can quickly access specific k-mer sequences and their contextual information during similarity assessments. The disclosure describes these indexing methods and data structures, including the use of hash tables and B-tree indices, which support dynamic search conditions and adjustments in query parameters.

To accommodate variations in musical key, the method 400 standardizes k-mer sequences based on their initial note. By normalizing intervals, the system 202 ensures that identical melodies transposed into different keys remain detectable, as required for reliably identifying potential infringements or regurgitations. This key normalization process allows the method 400 to focus on relative pitch relationships rather than absolute pitches, thereby enhancing the system's ability to recognize transposed patterns as equivalent.

In more advanced implementations, the method 400 incorporates both melodic and rhythmic indices. By expanding the indexing approach to include rhythmic patterns, the system 202 gains the ability to handle subtle variations that might not be evident from pitch sequences alone. This combined indexing strategy provides a more comprehensive assessment of similarity between k-mers and, by extension, between entire compositions.

Dynamic Indexing K-Mers with Conditioning

Figure 5:
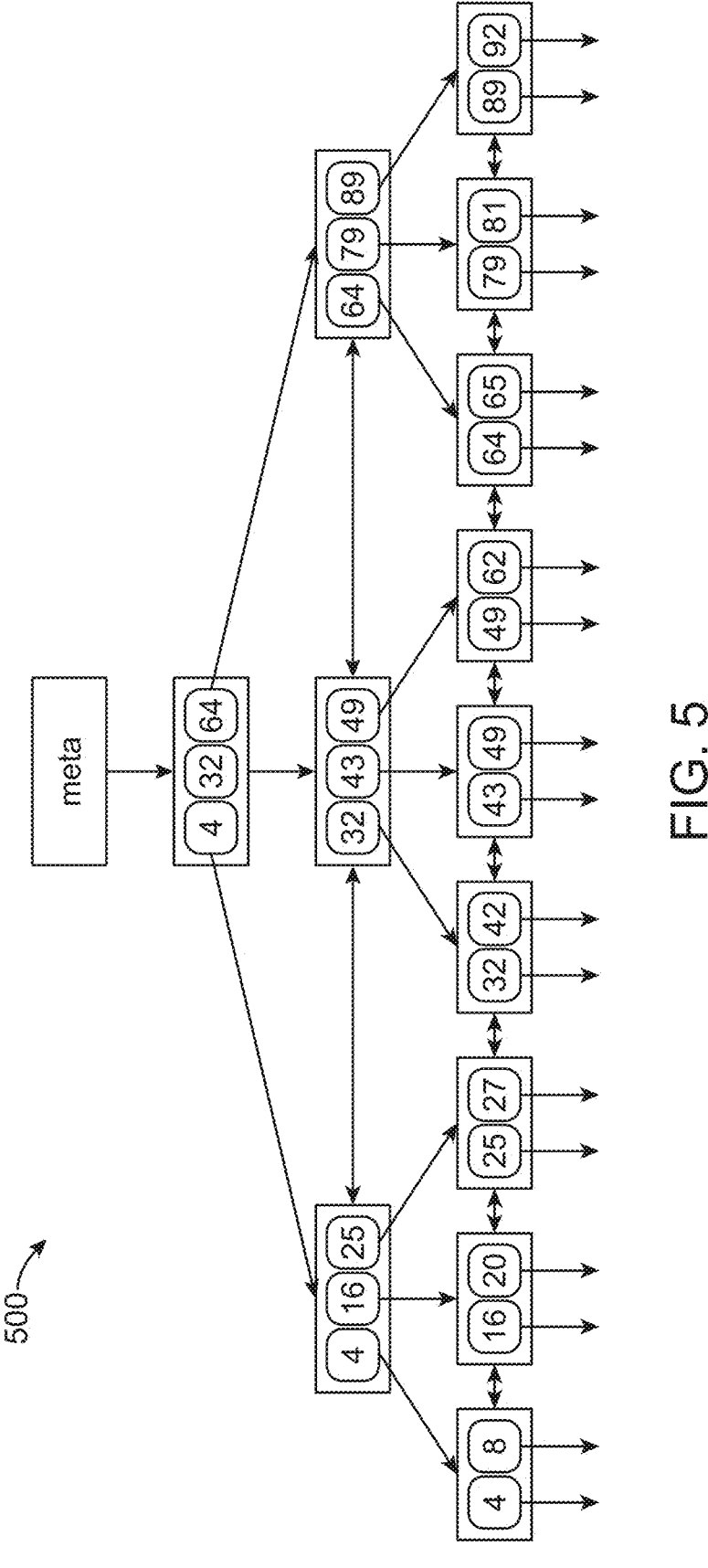
FIG. 5 is an exemplary representation of a method step of dynamically indexing k-mer sequences for symbolic music data using a B-tree structure, according to certain embodiments.

FIG. 5 is an exemplary representation of a method step of dynamically indexing k-mer sequences for symbolic music data using a B-tree structure. The method 500 includes the creation of a B-tree index to organize the k-mer sequences extracted from musical compositions. Each k-mer is a short sequence of musical notes derived from the symbolic representation of a composition. By structuring these k-mers in a B-tree, the system 202 efficiently performs operations, such as lookup, insertion, and query operations, even as the size of the music database grows.

Upon constructing the B-tree index, the method 500 stores each k-mer in one of the leaf nodes of the tree. The B-tree is broken down into multiple levels, each corresponding to a node or page that contains references to other nodes or leaf pages. The top-level node, referred to as the meta node, serves as the root for managing the overall indexing scheme. The meta node points to intermediate nodes, which in turn reference leaf nodes that store the actual k-mer sequences and their associated metadata. Such hierarchical approach renders rapid navigation through the index, as the system 202 can follow pointers down the tree to locate a particular k-mer or group of k-mers efficiently.

Figure 6:
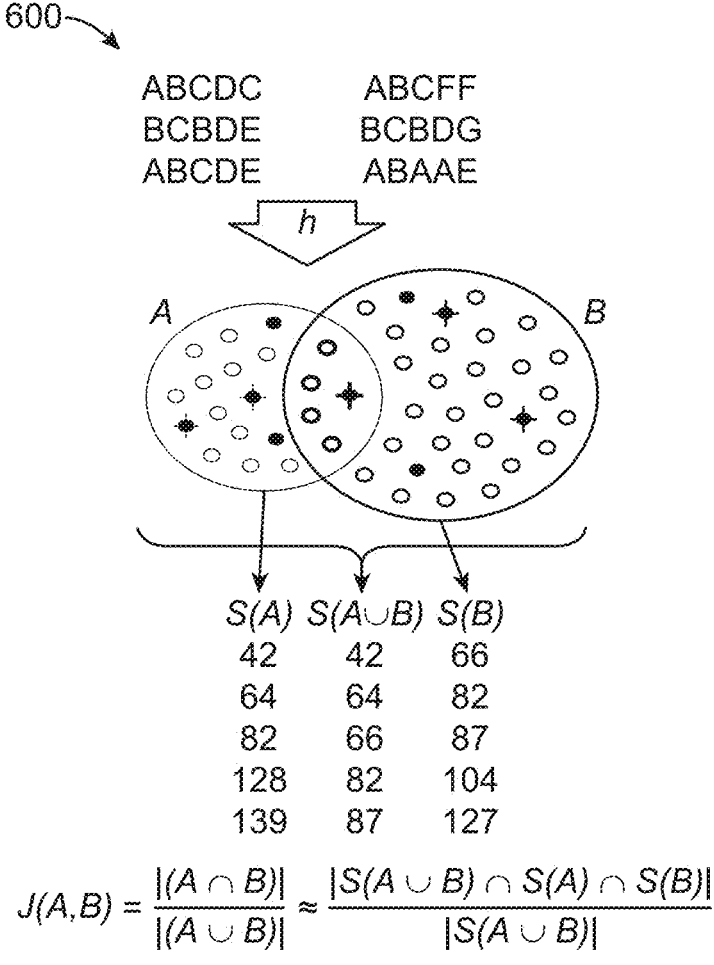
FIG. 6 is an exemplary representation of a method step of estimating the jaccard similarity index between two sets derived from musical sequences, according to certain embodiments.

Following the construction of the B-tree index, the method 500 enables dynamic conditioning of the queries through conditioning vectors. These conditioning vectors are designed to adapt the query parameters without the need for reindexing the full database. Each position in the conditioning vector corresponds to a position in the k-mer sequence and can be dynamically programmed. For example, a position may be set to handle insertions (−2), deletions (−1), ignoring that position entirely (0), focusing on only rhythm (1), focusing on only melody (2), or considering both melody and rhythm (3). Such flexibility ensures that the system 202 can handle variations in key, rhythmic patterns, and melodic shifts Estimating Similarity Index FIG. 6 is an exemplary representation of a method step of estimating the jaccard similarity index between two sets derived from musical sequences. The method 600 includes receiving two sets of hash values, each corresponding to distinct k-mer sequences extracted from symbolic musical data. These sets, referred to herein as Set A and Set B, represent two separate musical compositions that have been processed into hash values following the application of a hash function to their constituent k-mers.

Upon receiving the two sets, the method 600 applies a MinHash bottom sketch strategy. The method 600 includes selecting a smaller, random subset of hash values from the union of the two sets, A and B. Initially, each set (A and B) is represented as a collection of hash values, each derived from the hashed k-mers of the respective musical composition. The method 600 identifies and stores the minimal hash values from each set, also known as MinHash sketches, each sketch consisting of a predefined number (e.g., s=5) of these minimal hash values. By doing so, the method 600 creates compact sketches S(A) and S(B) that serve as representative signatures of the original sets, reducing the need for exhaustive pairwise comparisons of all hash values.

The method 600 then integrates S(A) and S(B) to form S(A∪B), a sketch representing the union of sets A and B. By selecting the minimal hash values from A∪B, the method 600 obtains a consistent approximation of how the sets overlap. The ratio of shared minimal hash values between S(A) and S(B) within the union sketch S(A∪B) provides an unbiased estimate of the Jaccard similarity index J(A,B). Such estimation allows the method 600 to determine how similar two musical sequences are, based on the proportion of shared k-mers, without explicitly calculating the intersection and union of all elements in the original sets.

Following the integration and comparison of these sketches, the method 600 calculates the Jaccard similarity index. The Jaccard index is defined as the size of the intersection of A and B divided by the size of their union. While directly computing this intersection and union may be computationally expensive for large datasets, the MinHash approximation enables a rapid and efficient estimation. The result is a numerical value indicating the degree of similarity between two musical sequences, ranging from 0 (completely dissimilar) to 1 (identical sets)

Symbolic Musical Sequences Alignment

Figure 7:
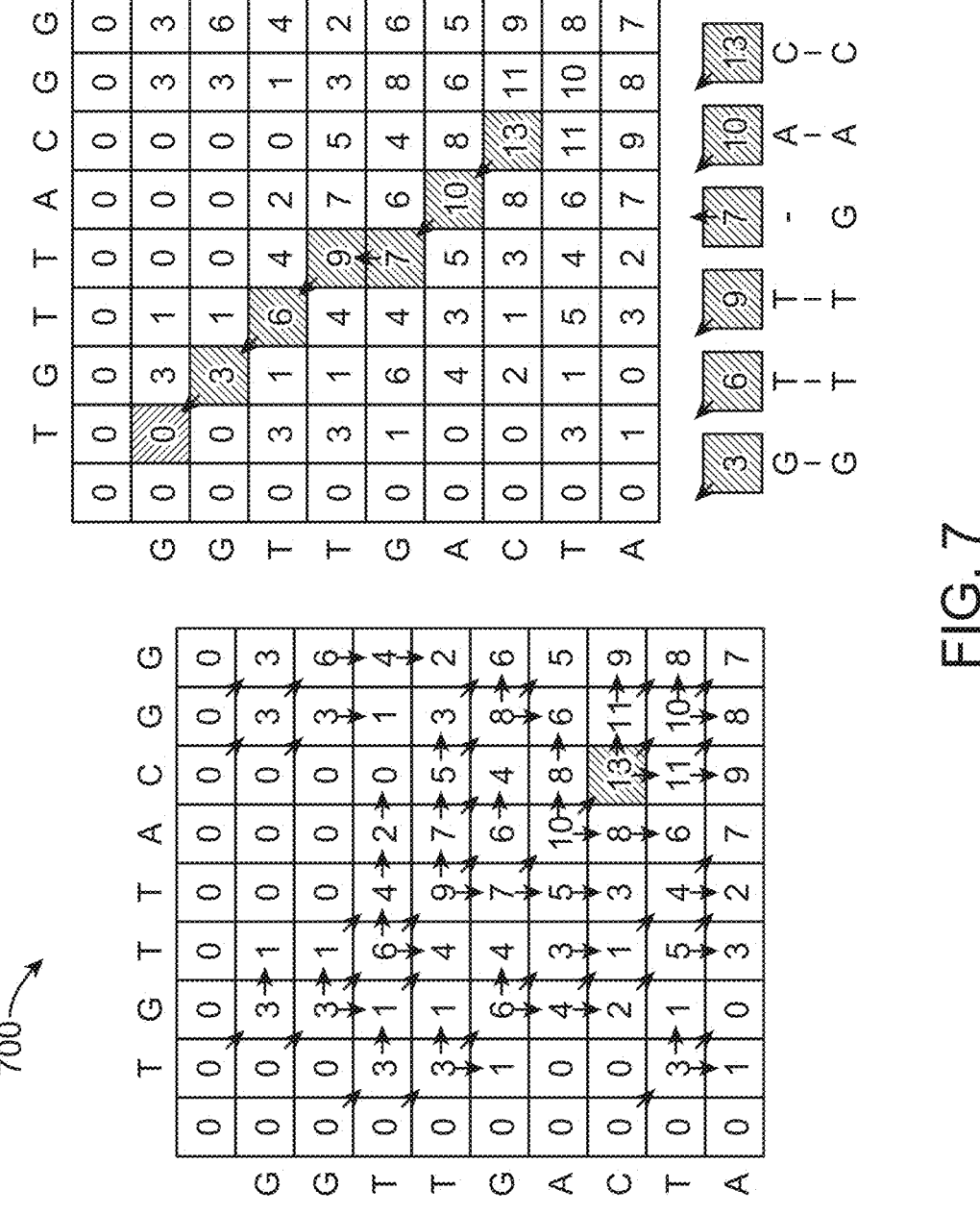
FIG. 7 is an exemplary representation a method of aligning symbolic musical sequences using a differential similarity matrix and dynamic programming algorithms, according to certain embodiments.

FIG. 7 is a flow chart of a method of aligning symbolic musical sequences using a differential similarity matrix and dynamic programming algorithms, as implemented by the system described herein. The method begins by quantizing both the input and reference tracks to a fixed resolution (e.g., ⅛ of a bar) and normalizing any chord or key information. Next, the system generates a differential similarity matrix where matching notes contribute a positive score, rest-to-rest alignments yield zero, and mismatches or unmatched notes incur penalties. By applying local alignment algorithms such as Smith-Waterman, the method locates segments of high similarity between the two sequences.

The method 700 initiated with the construction of a scoring matrix, representing pairwise comparisons between notes from two musical sequences. Each cell in the matrix corresponds to the alignment score of a particular note from the first sequence against a particular note from the second sequence. The scoring matrix is populated using scores that reward note matches, penalize mismatches, and account for gaps (e.g., rests or missing notes) in the sequences.

Upon constructing the scoring matrix, the method 700 identifies a cell containing the maximum alignment score.

This cell represents the endpoint of the optimal local alignment. The method 700 then proceeds to a traceback step, starting from the cell with the maximum score and moving backward through the matrix. During this traceback, the method 700 follows directional pointers (arrows) that indicate which path leads to the highest scoring alignment. These pointers guide the system 202 in reconstructing the optimal local alignment, ensuring that subsequences of the musical pieces are optimally matched.

As the method 700 traces back through the matrix, it identifies the specific notes from each musical sequence that contribute to the optimal alignment. Regions of aligned notes are highlighted, indicating where the sequences share similar melodic or harmonic patterns. Upon completing the traceback, the method 700 outputs the resulting aligned subsequences, revealing, for example, that notes G, T, T, A, C, and G in one sequence align optimally with corresponding notes in the other sequence.

Scaling Multiple Alignments

Figure 8:
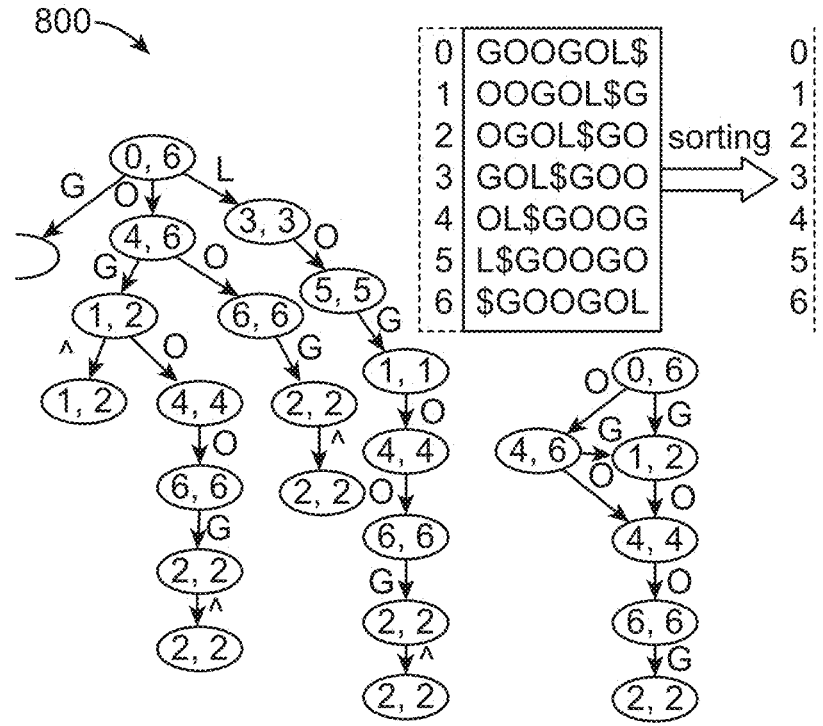
FIG. 8 is an exemplary representation of a method step of scaling multiple alignments for symbolic music data, according to certain embodiments.

FIG. 8 is an exemplary representation of a method step of scaling multiple alignments for symbolic music data. The method 800 step addresses the challenge posed by the exponential growth of time and space requirements when performing comprehensive alignments (e.g., Smith-Waterman) across numerous musical sequences. To overcome these limitations, the method 800 implements heuristic algorithm frameworks that seek quasi-optimal alignment solutions within reasonable time and space.

In one embodiment, a custom implementation of the Burrows-Wheeler Aligner (BWA) is performed to identify and match symbolic musical data, such as MIDI note pitches and rhythms (between onsets), against a database of indexed MIDI files. By converting both the input sequence and the reference library into a Burrows-W heeler transformed index, the system 202 can efficiently locate matching melodic and rhythmic patterns with high accuracy, even in the presence of minor deviations or inserted notes. Such BWA-based approach greatly reduces search times compared to traditional pattern-matching techniques and provides substantial compression benefits, thereby enabling large-scale music retrieval and analysis while maintaining minimal resource overhead The method 800 step includes the construction of a hierarchical clustering tree for a set of musical sequences. Each node in the tree represents a comparison between two sequences, with an associated alignment score indicating their similarity. As the tree branches out, the method 800 identifies and resolves redundant alignments, ensuring that each pairwise comparison is represented efficiently.

Following the construction of the hierarchical clustering tree, the method 800 proceeds to sequence sorting. In this step, the aligned musical sequences are arranged according to their similarity scores, producing a sorted list of sequences in descending order of alignment quality. By doing so, the method 800 enables the system 202 to prioritize sequences that share strong melodic or harmonic resemblances. For example, sequences such as GOOGOLS, OGOLSGO, and SGOOGO may appear near the top of the sorted list if they exhibit closely related patterns.

The method 800 continues by refining the tree structure. Where nodes yield identical scores, the method 800 consolidates these nodes, thereby reducing redundant computations and enhancing the efficiency of subsequent analyses. This consolidation step ensures that the hierarchical clustering provides a concise yet comprehensive representation of relationships among multiple sequences.

Aligning Portions of Multiple Musical Sequences

Figure 9:
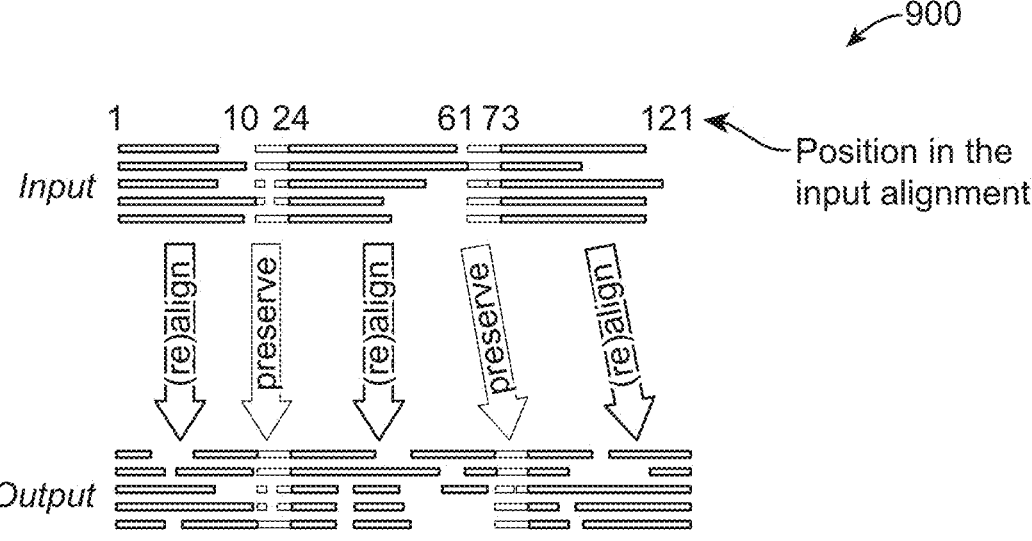
FIG. 9 is an exemplary representation of a method step of selectively realigning portions of multiple musical sequences, according to certain embodiments.

FIG. 9 is an exemplary representation of a method step of selectively realigning portions of multiple musical sequences, as implemented by the system 202. The method 900 step includes analyzing an existing alignment, depicted as an input, and dividing the sequences into regions marked for preservation versus realignment. Certain positions in the input alignment, such as positions in between 10-24 and 61-73, are recognized as stable or previously validated alignments and remain unchanged, while the positions in between 1-10, 24-61, and 73-121 indicate regions that may benefit from improved alignment.

The method 900 implements Multiple Alignment using Fast Fourier Transform (MAFFT) for realignment tasks. By converting symbolic music data (e.g., notes, chords, or rhythmic events) into a suitable representation, MAFFT's algorithm introduces gaps for skipped notes or pauses and penalizes mismatches to accommodate variations. For example, slight deviations in repetition of themes or transpositions can be realigned without disrupting the validated segments. Such selective reanalysis ensures that only the designated portions of the alignment (undergo refinement, reducing computational overhead and preserving alignment fidelity in regions already deemed accurate.

Upon completing the realignment, the system 202 generates an Output alignment in which positions 10-24, 61-73 remain intact while the newly realigned portions exhibit improved note correspondence.

Regurgitations in AI-Generated Music through a Smith-Waterman (SW) Heatmap

Figure 10:
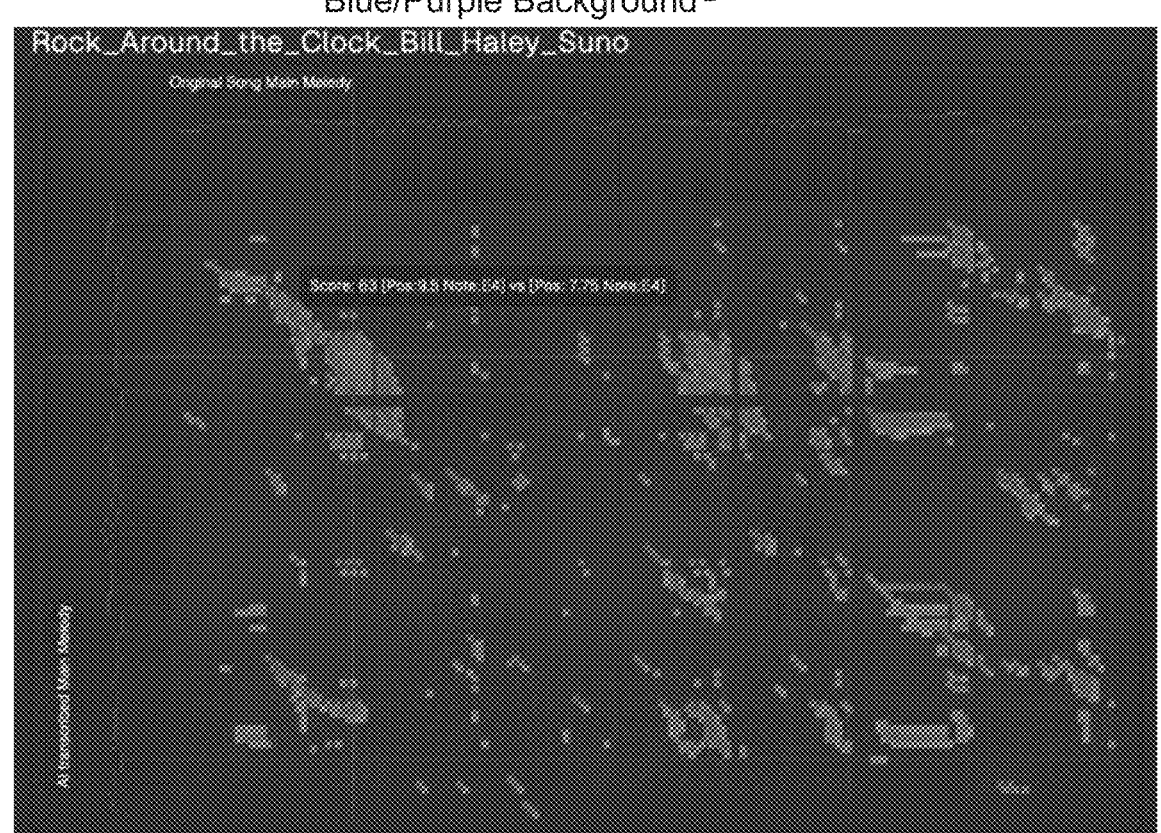
FIG. 10 is a graphical representation of visualizing subtle regurgitations in AI-generated music through a Smith-Waterman (SW) Heatmap, according to certain embodiments.

FIG. 10 is a graphical representation of visualizing subtle regurgitations in AI-generated music through a Smith-Waterman (SW) Heatmap, as implemented by the system 202 described herein. The method 1000 begins by comparing an original song melody with an AI-transcribed main melody derived from a generative music LLM (Large Language Model) output. The SW Heatmap provides a visual representation of where these two sequences align, highlighting areas of strong similarity even in the absence of exact replication.

In the heatmap, the horizontal axis corresponds to positions of notes in the original composition, and the vertical axis corresponds to positions of notes in the AI-transcribed melody. By applying a color-coded gradient, the system 202 indicates levels of alignment. First region 1002 indicates high similarity, suggesting that certain motifs or note sequences are closely matched between the original and the AI-generated output. Second region 1004 indicates moderate alignment, representing partial matches or variations that still bear some resemblance. Third region 1006 indicates areas with no significant alignment, indicating dissimilar or unrelated segments.

In a specific highlighted area, a score of 63 is shown at positions approximately 9.5 (Note: E4) in the original melody and 7.75 (Note: E4) in the AI-transcribed melody. This strongly aligned region, labeled as region 1004, exemplifies how the AI-generated music "regurgitates" patterns from the original composition. Another region, 1002, also demonstrates noteworthy alignment, though with lower similarity.

These visual indicators are critical for understanding that not all AI-generated outputs are straightforward, exact copies of copyrighted material. Clear copyright infringements in music typically involve the direct copying or reproduction of a sequence of notes or an entire melody from an original composition without permission. Such exact infringements are easier to detect with alignment algorithms like BWA or MAFFT, which rapidly identify nearly identical sequences in large databases.

In contrast, AI-generated music often "regurgitates" patterns, motifs, or styles learned from vast datasets of original music. These outputs may not be identical copies but may resemble the originals through subtle variations or recombination of musical ideas. Detecting AI-generated regurgitations poses a greater challenge for search and alignment algorithms because the variations might involve shifts in rhythm, key, or structure, which are more difficult to identify using simple sequence matching. Algorithms like MAFFT, with its ability to handle gaps and near matches, are better suited for this task.

Hybrid Approach with Audio and Midi Data

Figure 11:
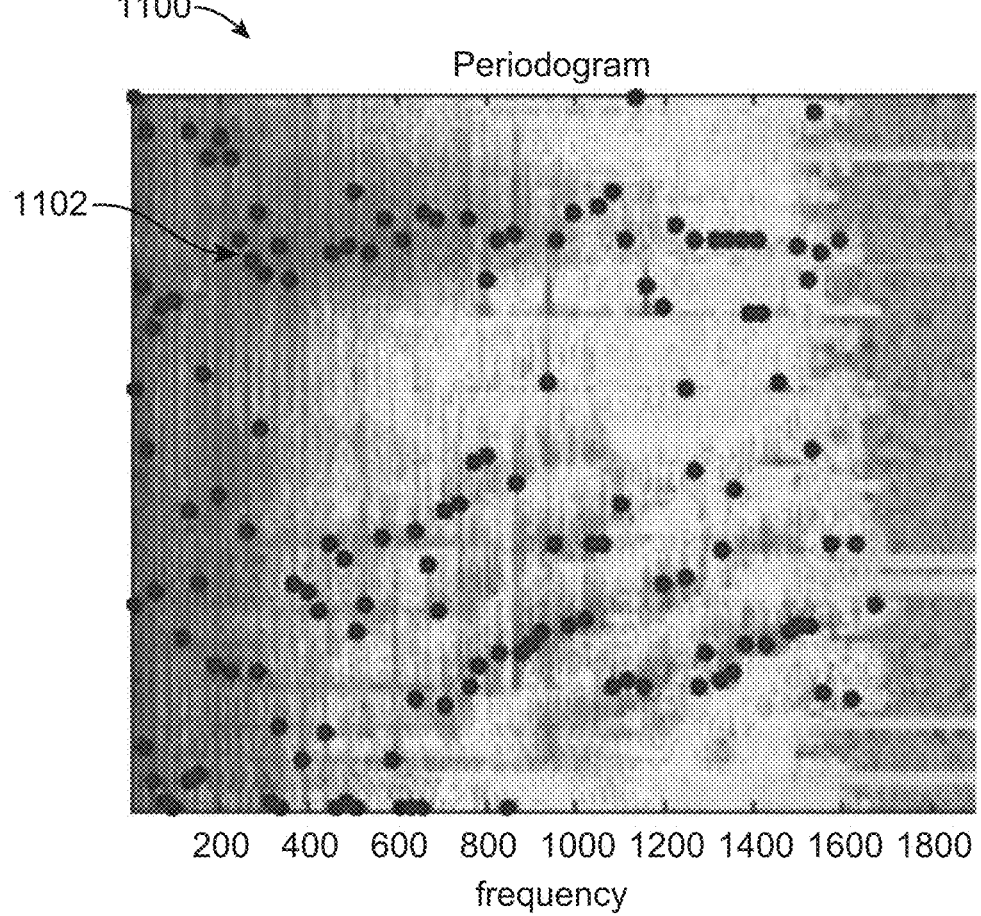
FIG. 11 is an exemplary representation of extraction of frequency-domain features and identification of musical fingerprints, according to certain embodiments.

FIG. 11 is an exemplary representation of extraction of frequency-domain features and identification of musical fingerprints. The system 202 applies a frequency-domain transformation, such as a Fast Fourier Transform (FFT), to convert time-based sound data into a frequency representation. This transformation produces a periodogram, depicted as a two-dimensional visualization where the horizontal axis corresponds to frequency in Hertz (Hz)—ranging approximately from 0 to 1800 Hz—and the vertical axis corresponds to time.

Upon generating this periodogram, the system 202 applies a color gradient to represent signal intensity at various frequencies over time. Warm colors such as red and yellow indicate high-intensity frequencies, revealing strong harmonic components or prominent musical notes. In contrast, cooler colors such as blue represent quieter or less active frequency regions within the audio.

Next, the system 202 identifies and extracts key frequency peaks from the periodogram, overlaying them as distinct blue dots. These peaks serve as "musical fingerprints," capturing unique spectral features of the audio signal. By extracting the peaks, the system 202 can reference them against known patterns or compare them across multiple tracks to identify exact or near-identical matches. This is particularly useful in evaluating whether two pieces of music share fundamental structures, motifs, or harmonic progressions, thereby aiding in the detection of subtle infringements or regurgitated patterns generated by AI models.

The system 202 indicates a specific region of interest, indicated by an arrow, where a significant cluster of frequency peaks emerges. This highlighted region focuses attention on tonal components that may form the basis for comparative fingerprinting and advanced alignment tasks. For instance, integrating these extracted peaks with other analysis techniques, such as Smith-Waterman heatmaps, enables the system 202 to detect subtle variations, transpositions, or tempo changes more effectively.

Musical Composition as a Network

Figure 12:
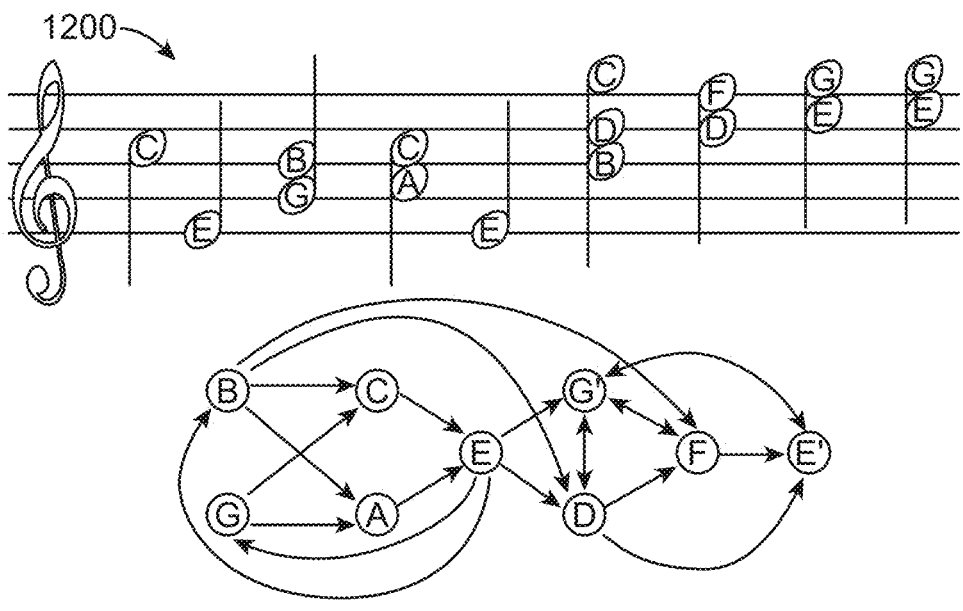
FIG. 12 represents a musical composition as a network to analyze note transitions, according to certain embodiments.

FIG. 12 represents a musical composition as a network to analyze note transitions, as implemented by the system 202 described herein. The system 202 receives a symbolic representation of a musical sequence (e.g., in standard music notation). Each note is recorded with its pitch, duration, and position in the sequence.

The system 202 is then configured to construct a network where each node (e.g., represented as a yellow circle) corresponds to a note in the composition. Directed edges (arrows) between nodes represent transitions from one note to the next in time. These edges capture both sequential transitions and simultaneous occurrences (e.g., chords), thereby encoding not only the linear progression of notes but also the harmonic and temporal relationships within the piece.

Once the network is assembled, the system 202 identifies patterns, such as recurring motifs, circular progressions, or characteristic transitions. Analyzing these structural relationships allows the system 202 to compare the network of one composition against others, revealing whether a second piece shares similar underlying frameworks of melodic or harmonic motion. This network-based approach is especially valuable for detecting subtle infringements, such as when a generative AI model produces outputs that replicate the structural essence of a copyrighted work without copying exact note sequences.

Training a Neural Embedding Model

Figure 13:
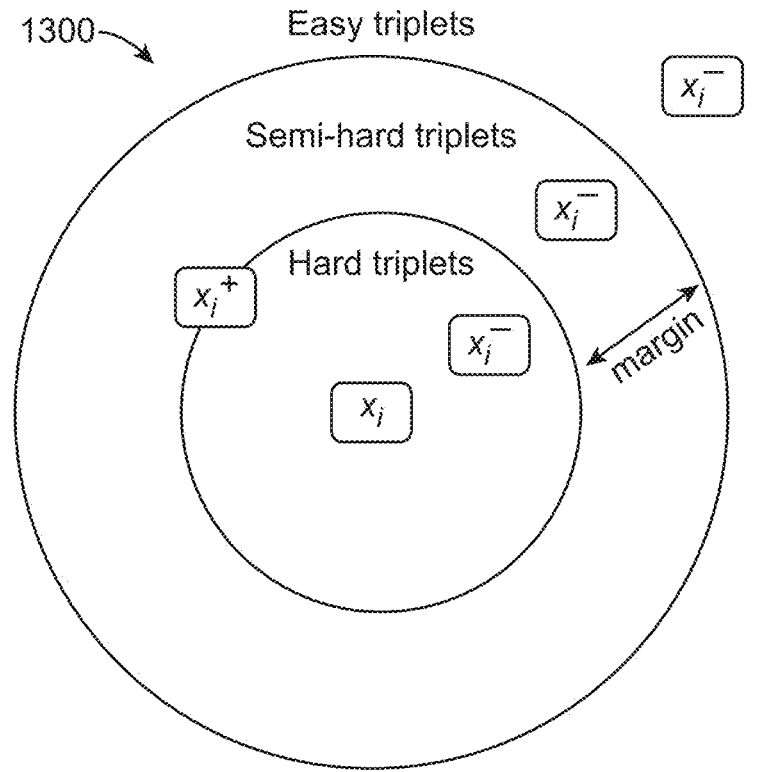
FIG. 13 is a representation of a process of training a neural embedding model using a triplet loss strategy to identify generative AI (genAI) copyright infringements, according to certain embodiments.

FIG. 13 is a representation of a process of training a neural embedding model using a triplet loss strategy to identify generative AI (genAI) copyright infringements, as implemented by the system 202 described herein. The method involves selecting multiple versions of a given song, along with unrelated musical pieces, to form anchor, positive, and negative samples. This process includes preparing a dataset of musical transcriptions, comprising human MIDI transcriptions, AI MIDI transcriptions, and synthetic AI-generated regurgitations of the same song. The system 202 ensures that anchor and positive samples correspond to the same underlying work, while negative samples are derived from distinct compositions.

Once the samples are prepared, each sample is embedded into a common embedding space using a modified neural network model, such as an Anticipatory Transformer with its last layer removed for fine-tuning. During the embedding process, an anchor point, representing a specific version of a song, is placed in the embedding space alongside its corresponding positive samples (green-labeled points from the same song) and negative samples (red-labeled points from unrelated compositions). A triplet loss function is applied to optimize the model parameters, enforcing minimization of anchor-positive distances while ensuring anchor-negative distances exceed them by a predefined margin.

The training process is further refined by focusing on semi-hard triplets. Semi-hard triplets are defined as cases where the negative samples lie within a challenging margin: they are neither trivially distant (easy triplets) nor closer than the positive samples (hard triplets). By emphasizing semi-hard triplets, the method ensures optimal improvement in the model's discriminative capability, effectively pulling positive samples closer to the anchor while pushing negative samples further away, without expending computational effort on trivial or excessively difficult examples.

Throughout the training process, distances within the embedding space are continuously monitored to achieve a configuration where all versions of the same song cluster closely together, while distinct songs form clearly separated clusters. The margin enforced by the triplet loss establishes a buffer zone between positive and negative samples, enhancing the model's ability to differentiate between compositions—an essential requirement for identifying subtle generative AI-induced regurgitations of copyrighted music.

Upon completion of sufficient training iterations, the resulting model is optimized to map different transcriptions of the same song into a shared region of the embedding space. This configuration allows the model to identify similarities between outputs generated by AI systems and existing copyrighted works. By following the steps outlined in FIG. 13—selection of triplets, emphasis on semi-hard triplets, application of the triplet loss function, and enforcement of a margin—the method provides a rigorous and effective approach for detecting genAI infringements, thereby strengthening the protection of musical intellectual property rights.

Computer System

Figure 14:
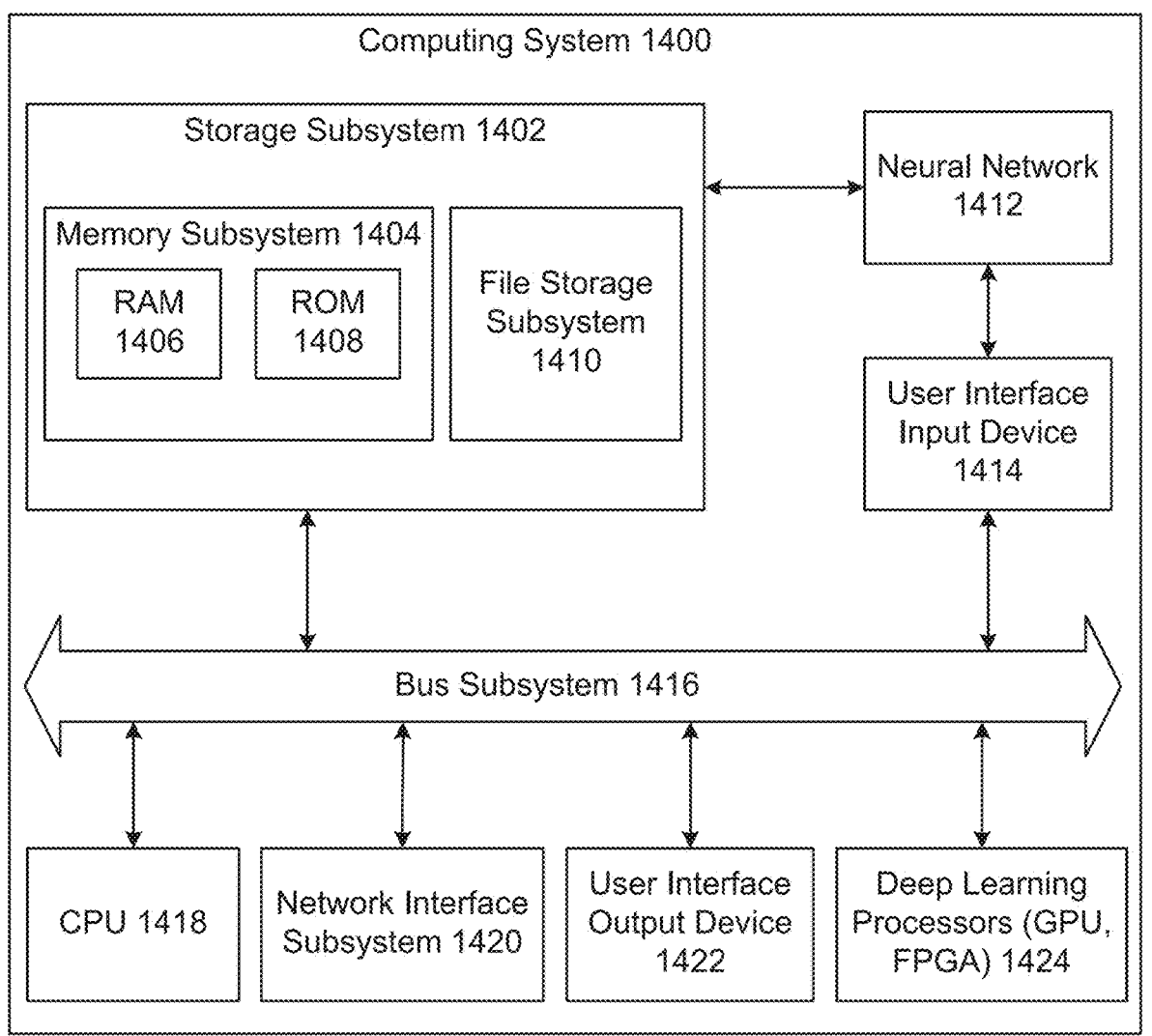
FIG. 14 shows an example computer system that can be used to implement the technology disclosed, according to certain embodiments.

FIG. 14 shows an example computer system 1400 that can be used to implement the technology disclosed. The computer system 1400 is a representation of the system 202, as described in FIG. 2. The computer system 1400 includes at least one central processing unit (CPU) 1418 that communicates with a number of peripheral devices via bus subsystem 1416. These peripheral devices can include a storage subsystem 1402 including, for example, memory devices and a file storage subsystem 1410, user interface input devices 1414, user interface output devices 1422, and a network interface subsystem 1420. The input and output devices allow user interaction with computer system 1400. Network interface subsystem 1420 provides an interface to outside networks, including an interface to corresponding interface devices in other computer systems.

In one implementation, a neural network 1412 is communicably linked to the storage subsystem 1402 and the user interface input devices 1414.

User interface input devices 1414 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1400.

User interface output devices 1422 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1400 to the user or to another machine or computer system.

Storage subsystem 1402 stores programming and data constructs that provide the functionality of some or all of the modules and methods described herein. These software modules are generally executed by deep learning processors 1424.

Deep learning processors 1424 can be graphics processing units (GPUs), field-programmable gate arrays (FPGAs), application-specific integrated circuits (ASICs), and/or coarse-grained reconfigurable architectures (CG RAs). Processors 1424 can be hosted by a deep learning cloud platform such as Google Cloud Platform™, Xilinx™, and Cirrascale™. Examples of processors 1424 include Google's Tensor Processing Unit (TPU)™, rackmount solutions like GX4 Rackmount Series™, GX6 Rackmount Series™, NVIDIA DGX-1™, Microsoft's Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1404 used in the storage subsystem 1402 can include a number of memories including a main random-access memory (RAM) 1406 for storage of instructions and data during program execution and a read only memory (ROM) 1408 in which fixed instructions are stored. A file storage subsystem 1410 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1410 in the storage subsystem 1402, or in other machines accessible by the processor.

Bus subsystem 1416 provides a mechanism for letting the various components and subsystems of computer system 1400 communicate with each other as intended. Although bus subsystem 1416 is shown schematically as a single bus, alternative implementations of the bus subsystem can use multiple buses.

Computer system 1400 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1400 depicted in FIG. 14 is intended only as a specific example for the purpose of illustrating the preferred implementations of the present technology disclosed. Many other configurations of computer system 1400 are possible having more or fewer components than the computer system depicted in FIG. 14.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 7, computer system/server in computing node 700 is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (E ISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Clauses

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Y et further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Y et another implementation of the clauses described in this section can include a system including memory and one or more processors operable to execute instructions, stored in the memory, to perform any of the clauses described in this section.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system for detecting musical infringement in symbolic music, the system comprising:
one or more processors; and
one or more memories configured to store instructions that, when executed by the one or more processors, perform operations comprising:
converting, using a transcription model, an audio input into a symbolic format when a first musical composition is provided as audio, wherein the transcription model is trained to extract a main melody;
generating a set of k-mer sequences from the first musical composition, wherein each k-mer sequence comprises a plurality of consecutive notes;
indexing the k-mer sequences in a data structure that enables retrieval, wherein the data structure is configured to handle dynamic conditioning vectors for selectively focusing on melody, rhythm, key, insertions, and deletions without requiring full reindexing;
comparing the k-mer sequences of the first musical composition to a plurality of k-mer sequences associated with a plurality of reference musical compositions stored in one or more databases;
estimating a similarity measure between the first musical composition and at least one reference musical composition in the plurality of reference musical compositions;
in response to determining that the similarity measure exceeds a threshold, performing a refined alignment of the first musical composition and the at least one reference musical composition using a local sequence alignment function adapted for music, wherein the local sequence alignment function accounts for key shifts, rests, and variations in melodic or rhythmic patterns;
determining, based on the refined alignment, whether the first musical composition includes at least one musical fragment that infringes upon or regurgitates a portion of the at least one reference musical composition; and
based on the determination, detecting music infringement by identifying that the first musical composition was recreated from copyrighted works, thus ensuring that content owners can detect unauthorized uses of their material.

2. The system of claim 1, wherein at least one data cleaning step is applied to the first musical composition prior to generating the plurality of k-mer sequences, and wherein the at least one data cleaning step comprises filtering out notes with anomalous pitches, converting chords to consecutive notes, normalizing keys, and removing sequences that fall below a minimal entropy threshold.

3. The system of claim 1, wherein the local sequence alignment function is performed by representing the first musical composition and the at least one reference musical composition on a quantized temporal grid, constructing a differential similarity matrix based on note comparisons and rest alignments.

4. The system of claim 1, wherein a larger set of conditioning vectors is applied upon determining that an initial similarity measure is below a similarity threshold.

5. The system of claim 1, wherein the audio input is received and converted into the symbolic format using the transcription model trained to isolate a main melody.

6. The system of claim 1, wherein the plurality of k-mer sequences is indexed by storing references to each k-mer in a hash table optimized for retrieval and associating each k-mer with metadata including instrument identifiers, positional data, and song identifiers.

7. The system of claim 1, wherein a first MinHash sketch is generated for the first musical composition and a second MinHash sketch is generated for the at least one reference musical composition, and wherein each MinHash sketch represents a reduced-size approximation of the set of k-mers.

8. The system of claim 1, wherein scoring elements are included in the local sequence alignment function such that matched notes yield a positive score, rest-to-rest matches yield a neutral score, and mismatches or unmatched notes incur penalties, thereby differentiating subtle variations from direct copying.

9. The system of claim 1, wherein results obtained from audio fingerprinting analysis are overlayed on spectrogram data with the local sequence alignment function results for combining symbolic sequence alignment with audio-based features to detect subtle variations, remixes, or regurgitated AI-generated content that are not captured by symbolic analysis alone.

10. The system of claim 1, wherein network representations of the first musical composition and the at least one reference musical composition are constructed, and wherein nodes represent notes and directed edges represent transitions between notes, and compare the network representations to identify recurring motifs or progressions that may indicate regurgitated content.

11. A method for detecting musical infringement in symbolic music, the method comprising:

receiving a first musical composition in a symbolic format that encodes musical elements;

generating a set of k-mer sequences from the first musical composition, each k-mer sequence comprising a series of notes;

indexing the set of k-mer sequences using a data structure configured to dynamically adjust query conditions for melody-only, rhythm-only, or combined melody-rhythm matches;

comparing the k-mer sequences of the first musical composition to a plurality of k-mer sequences associated with a plurality of reference musical compositions stored in one or more databases;

estimating a similarity measure between the first musical composition and at least one reference musical composition in the plurality of reference musical compositions;

determining that the at least one reference musical composition has a similarity measure exceeding a similarity threshold;

performing a local sequence alignment between the first musical composition and the at least one reference musical composition to account for transpositions, rest notes, and partial matches;

determining whether the first musical composition includes content that infringes upon the at least one reference musical composition based on the local sequence alignment; and based on the determination, detecting music infringement by identifying that the first musical composition was recreated from copyrighted works, thus ensuring that content owners can detect unauthorized uses of their material.

12. The method of claim 11, further comprising applying one or more data cleaning steps to the first musical composition prior to generating the plurality of k-mer sequences, wherein the data cleaning steps include filtering out notes with anomalous pitches, converting chords to consecutive notes, normalizing keys, and removing sequences that fall below a minimal entropy threshold.

13. The method of claim 11, wherein performing the local sequence alignment comprises:

representing both the first musical composition and the at least one reference musical composition on a quantized temporal grid;

constructing a differential similarity matrix based on note comparisons and rest alignments; and utilizing a dynamic programming algorithm selected from the group consisting of Smith-Waterman and Needleman-Wunsch to identify locally optimal alignments indicating potential infringements.

14. The method of claim 11, further comprising:

upon determining that an initial similarity measure is below the similarity threshold, applying a larger set of conditioning vectors to broaden a search criteria.

15. The method of claim 11, further comprising converting an audio input into the symbolic format using a transcription model, wherein the transcription model is trained to isolate a main melody, and wherein the main melody is used for generating the plurality of k-mer sequences and subsequent similarity estimation.

16. The method of claim 11, wherein indexing the plurality of k-mer sequences further comprises:

storing references to each k-mer in a hash table optimized for retrieval, and associating each k-mer with metadata including an instrument identifier, positional data, and a song identifier.

17. The method of claim 11, further comprising generating a first MinHash sketch for the first musical composition and a second MinHash sketch for the at least one reference musical composition, wherein each MinHash sketch represents a reduced-size approximation of the set of k-mer sequences.

18. The method of claim 11, wherein the local sequence alignment includes scoring elements such that matching notes have a positive score, rest-to-rest matches have a neutral score, and mismatches or unmatched notes incur a penalty.

19. The method of claim 11, further comprising overlaying results from an audio fingerprinting module that analyzes spectrograms of the first musical composition and the at least one reference musical composition, thereby combining symbolic alignment with audio-based features to detect subtle variations in tempo, instrumentation, or style that may still constitute infringement.

20. One or more non-transitory, computer-readable media storing instructions thereon that cause one or more processors to perform operations comprising:

receiving a first musical composition in a symbolic format that encodes musical elements;

generating a set of k-mer sequences from the first musical composition, each k-mer sequence comprising a series of notes;

indexing the set of k-mer sequences using a data structure configured to dynamically adjust query conditions for melody-only, rhythm-only, or combined melody-rhythm matches;

comparing the k-mer sequences of the first musical composition to a plurality of k-mer sequences associated with a plurality of reference musical compositions stored in one or more databases;

estimating a similarity measure between the first musical composition and at least one reference musical composition in the plurality of reference musical compositions;

determining that the at least one reference musical composition has a similarity measure exceeding a similarity threshold;

performing a local sequence alignment between the first musical composition and the at least one reference musical composition to account for transpositions, rest notes, and partial matches;

determining whether the first musical composition includes content that infringes upon the at least one reference musical composition based on the local sequence alignment; and based on the determination, detecting music infringement by identifying that the first musical composition was recreated from copyrighted works, thus ensuring that content owners can detect unauthorized uses of their material.

\* \* \* \* \*